US011373448B2

(12) United States Patent
Sugimoto

(10) Patent No.: US 11,373,448 B2
(45) Date of Patent: Jun. 28, 2022

(54) EMOTION INFERENCE DEVICE, EMOTION INFERENCE METHOD, AND RECORDING MEDIUM

(71) Applicant: Panasonic Intellectual Property Management Co., Ltd., Osaka (JP)

(72) Inventor: Takashi Sugimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 16/977,463

(22) PCT Filed: Oct. 25, 2018

(86) PCT No.: PCT/JP2018/039713
§ 371 (c)(1),
(2) Date: Sep. 1, 2020

(87) PCT Pub. No.: WO2019/193781
PCT Pub. Date: Oct. 10, 2019

(65) Prior Publication Data
US 2020/0410217 A1 Dec. 31, 2020

(30) Foreign Application Priority Data
Apr. 4, 2018 (JP) .............................. JP2018-071994

(51) Int. Cl.
*G06K 9/00* (2022.01)
*G06V 40/16* (2022.01)
(Continued)

(52) U.S. Cl.
CPC ............ *G06V 40/174* (2022.01); *G06F 3/011* (2013.01); *G06F 3/017* (2013.01); *G06T 7/0014* (2013.01);
(Continued)

(58) Field of Classification Search
CPC .... G06V 40/174; G06V 40/193; G06F 3/011; G06F 3/013; G06F 3/017; G06F 3/14;
(Continued)

(56) References Cited

U.S. PATENT DOCUMENTS

2003/0014215 A1  1/2003  Sugiyama et al.
2004/0197013 A1  10/2004 Kamei
(Continued)

FOREIGN PATENT DOCUMENTS

JP   2002-366173 A   12/2002
JP   2006-338686 A   12/2006
(Continued)

OTHER PUBLICATIONS

International Search Report issued in corresponding International Patent Application No. PCT/JP2018/039713, dated Jan. 29, 2019, witn English translation.

*Primary Examiner* — Gabriel I Garcia
(74) *Attorney, Agent, or Firm* — McDermott Will & Emery LLP

(57) ABSTRACT

An emotion inference device includes: an obtainer that obtains a second evaluation value group and then a first evaluation value group each including evaluation values corresponding to emotion attributes of classified emotions of a subject; a processor that, when a difference under the same emotion attribute between corresponding evaluation values in the first and second evaluation value groups does not exceed a predetermined criterion, performs a correction process to reduce the evaluation value corresponding to the same emotion attribute in the first evaluation value group, and performs an inference process to infer the emotion of the subject based on the corrected first evaluation value group, in which an emotion attribute having a relatively higher evaluation value is inferred relatively more strongly as the (Continued)

emotion of the subject; and an outputter that outputs a result of the inference process performed by the processor.

15 Claims, 14 Drawing Sheets

(51) Int. Cl.
*G06F 3/01* (2006.01)
*G06T 7/00* (2017.01)

(52) U.S. Cl.
CPC ............. *G06F 2203/011* (2013.01); *G06T 2207/20224* (2013.01); *G06T 2207/30201* (2013.01)

(58) Field of Classification Search
CPC ............. G06F 2203/011; G06T 7/0014; G06T 2207/20224; G06T 2207/30201
USPC .................................................. 382/100, 117
See application file for complete search history.

(56) References Cited

U.S. PATENT DOCUMENTS

| | | |
|---|---|---|
| 2009/0003709 A1 | 1/2009 | Kaneda et al. |
| 2011/0052081 A1 | 3/2011 | Onoe et al. |
| 2017/0235975 A1* | 8/2017 | Iwanami ............... H04W 12/02 726/28 |
| 2017/0311863 A1 | 11/2017 | Matsunaga |
| 2017/0323013 A1* | 11/2017 | Morimoto ............. A61B 5/165 |
| 2018/0011977 A1* | 1/2018 | Takeda ................ G06V 10/758 |
| 2018/0303397 A1* | 10/2018 | Krupat ................ A61B 5/4842 |
| 2020/0186748 A1* | 6/2020 | Baba ........................ H04N 5/91 |
| 2020/0349337 A1* | 11/2020 | Kameni ................ G06F 3/013 |
| 2021/0209388 A1* | 7/2021 | Ciftci .................... G06V 40/40 |

FOREIGN PATENT DOCUMENTS

| | | |
|---|---|---|
| JP | 2009-15372 A | 1/2009 |
| JP | 2011-70623 A | 4/2011 |
| JP | 2014-178970 A | 9/2014 |
| JP | 2018-149053 A | 8/2016 |

* cited by examiner

FIG. 3

| EMOTION ATTRIBUTE | EVALUATION VALUE GROUP OF N-TH ROUND OF EVALUATION | EVALUATION VALUE GROUP OF (N+1)TH ROUND OF EVALUATION | EVALUATION VALUE GROUP OF (N+2)TH ROUND OF EVALUATION |
|---|---|---|---|
| | EVALUATION VALUE | EVALUATION VALUE | EVALUATION VALUE |
| ... | ... | ... | ... |
| NEUTRAL | 50 | 50 | 50 |
| JOY | 0 | 0 | 20 |
| SURPRISE | 5 | 5 | 0 |
| ANGER | 15 | 15 | 10 |
| SADNESS | 30 | 30 | 30 |

FIG. 4

| EMOTION ATTRIBUTE | CORRECTION VALUE |
|---|---|
| NEUTRAL | 0 |
| JOY | 0 |
| SURPRISE | 0 |
| ANGER | 0 |
| SADNESS | 0 |

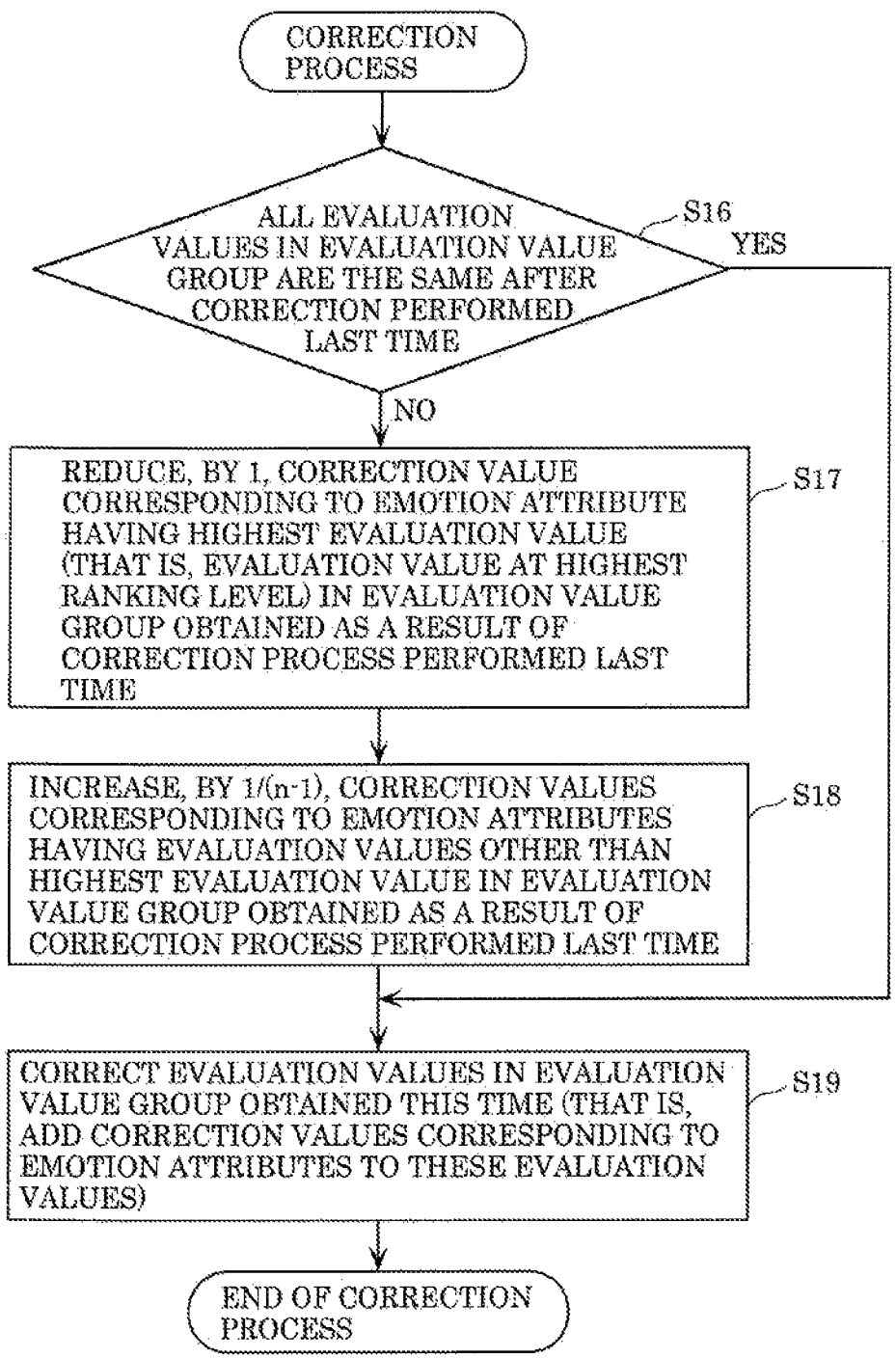

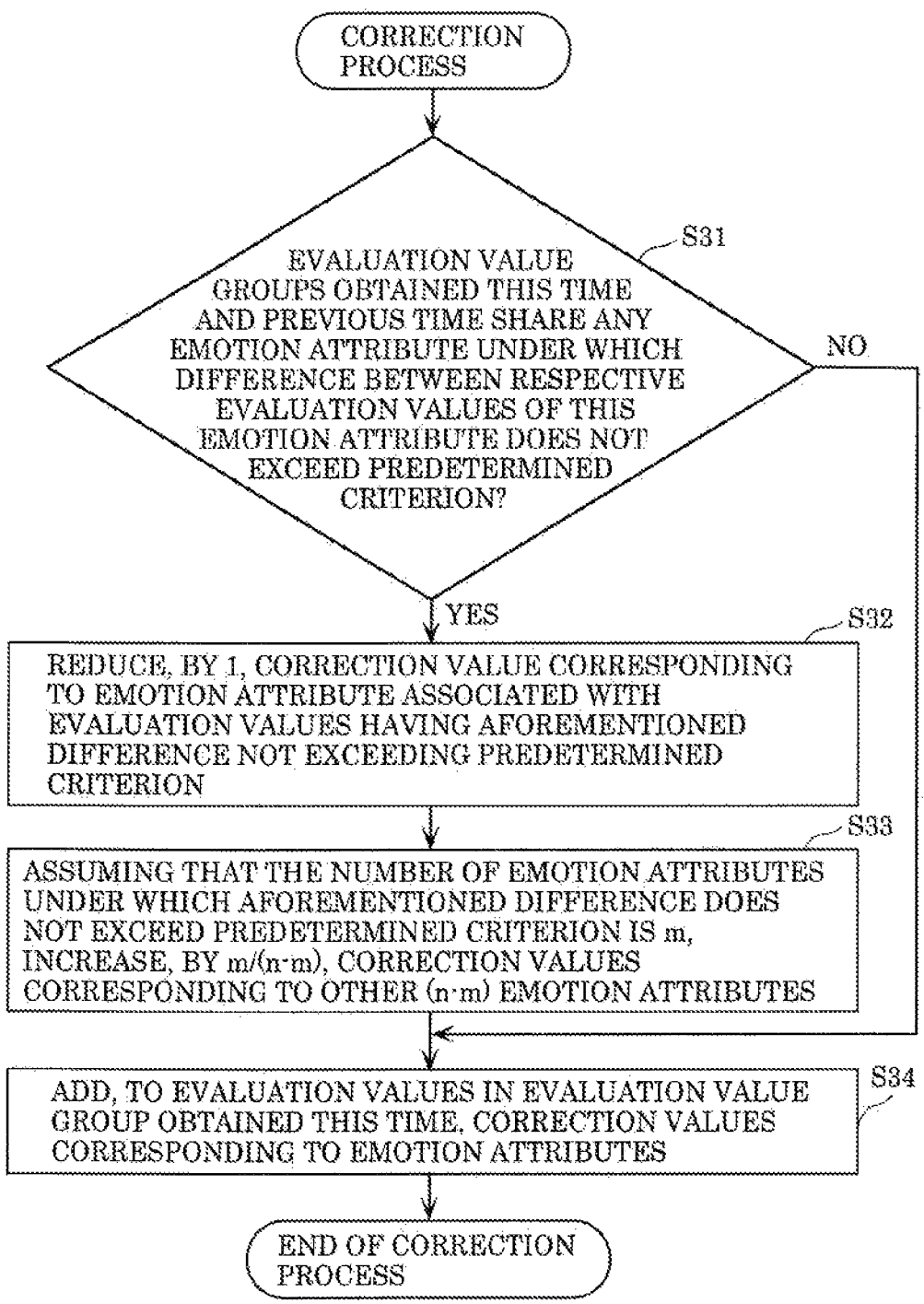

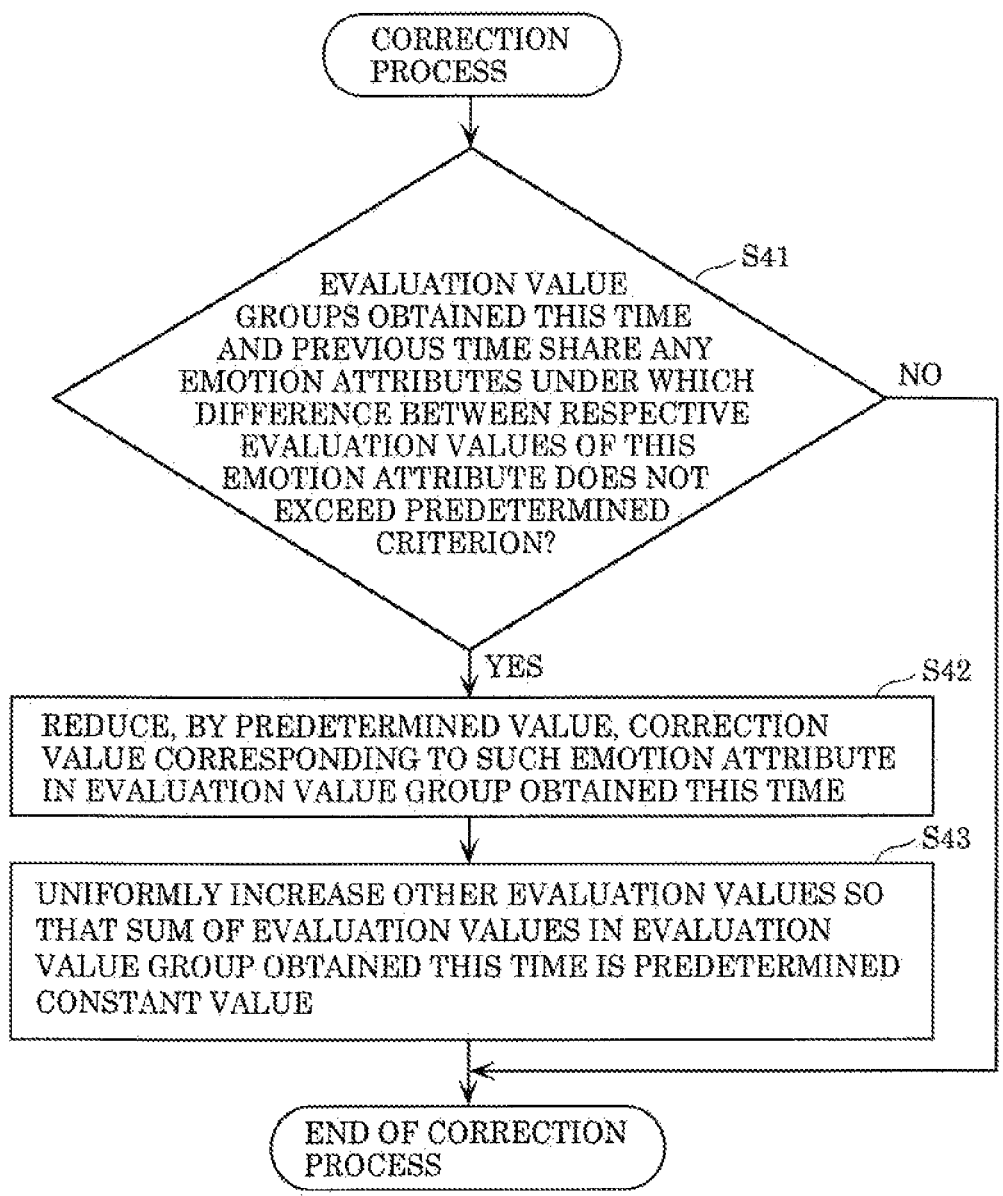

FIG. 7

| ROUND | RESULT OF EVALUATION (EVALUATION VALUE GROUP) | | | | | CORRECTION VALUE | | | | | EVALUATION VALUE GROUP AS A RESULT OF CORRECTION PROCESS | | | | |
|---|---|---|---|---|---|---|---|---|---|---|---|---|---|---|---|
| | NEUTRAL | JOY | SURPRISE | ANGER | SADNESS | NEUTRAL | JOY | SURPRISE | ANGER | SADNESS | NEUTRAL | JOY | SURPRISE | ANGER | SADNESS |
| 0 | 50 | 0 | 0 | 5 | 30 | 0 | 0 | 0 | 0 | 0 | 50 | 0 | 5 | 5 | 30 |
| 1 | 50 | 0 | 5 | 15 | 30 | -1 | 0.25 | 0.25 | 0.25 | 0.25 | 49 | 0.25 | 5.25 | 15.25 | 30.25 |
| 2 | 50 | 0 | 5 | 15 | 30 | -2 | 0.5 | 0.5 | 0.5 | 0.5 | 48 | 0.5 | 5.5 | 15.5 | 30.5 |
| 3 | 50 | 0 | 5 | 15 | 30 | -3 | 0.75 | 0.75 | 0.75 | 0.75 | 47 | 0.75 | 5.75 | 15.75 | 30.75 |
| 4 | 50 | 0 | 5 | 15 | 30 | -4 | 1 | 1 | 1 | 1 | 46 | 1 | 6 | 16 | 31 |
| ... | ... | ... | ... | ... | ... | ... | ... | ... | ... | ... | ... | ... | ... | ... | ... |
| 25 | 50 | 0 | 5 | 15 | 30 | -25 | 10 | 10 | 10 | -5 | 25 | 10 | 15 | 25 | 25 |
| 26 | 50 | 0 | 5 | 15 | 30 | -26 | 11.5 | 11.5 | 9 | -6 | 24 | 11.5 | 16.5 | 24 | 24 |
| 27 | 50 | 0 | 5 | 15 | 30 | -27 | 13 | 13 | 8 | -7 | 23 | 13 | 18 | 23 | 23 |
| 28 | 50 | 0 | 5 | 15 | 30 | -28 | 14.5 | 14.5 | 7 | -8 | 22 | 14.5 | 19.5 | 22 | 22 |
| 29 | 50 | 0 | 5 | 15 | 30 | -29 | 16 | 16 | 6 | -9 | 21 | 16 | 21 | 21 | 21 |
| 30 | 50 | 20 | 5 | 15 | 20 | -30 | 20 | 15 | 5 | -10 | 20 | 20 | 20 | 20 | 20 |
| 31 | 50 | 20 | 5 | 15 | 20 | -30 | 20 | 15 | 5 | -10 | 20 | 40 | 15 | 15 | 10 |
| 32 | 50 | 20 | 0 | 10 | 20 | -29.75 | 19 | 16.25 | 6.25 | -9.75 | 20.25 | 39 | 15.25 | 15.25 | 10.25 |
| 33 | 50 | 20 | 0 | 10 | 20 | -29.5 | 18 | 16.5 | 5.5 | -9.5 | 20.5 | 38 | 15.5 | 16.5 | 10.5 |
| 34 | 50 | 20 | 0 | 10 | 20 | -29.25 | 17 | 15.75 | 5.75 | -9.25 | 20.75 | 37 | 15.75 | 15.75 | 10.75 |
| ... | ... | ... | ... | ... | ... | ... | ... | ... | ... | ... | ... | ... | ... | ... | ... |
| 45 | 50 | 20 | 0 | 10 | 20 | -26.5 | 6 | 18.5 | 8.5 | -6.5 | 23.5 | 26 | 18.5 | 18.5 | 13.5 |
| 46 | 50 | 20 | 0 | 10 | 20 | -26.25 | 5 | 18.75 | 8.75 | -6.25 | 23.75 | 25 | 18.75 | 18.75 | 13.75 |
| 47 | 50 | 20 | 0 | 10 | 20 | -26 | 4 | 19 | 9 | -6 | 24 | 24 | 19 | 19 | 14 |
| 48 | 50 | 20 | 0 | 10 | 20 | -27 | 3 | 19.66667 | 9.66667 | -5.33333 | 23 | 23 | 19.66667 | 19.66667 | 14.66667 |
| 49 | 50 | 20 | 0 | 10 | 20 | -28 | 2 | 20.33333 | 10.33333 | -4.66667 | 22 | 22 | 20.33333 | 20.33333 | 15.33333 |
| 50 | 50 | 20 | 0 | 10 | 20 | -29 | 1 | 21 | 11 | -4 | 21 | 21 | 21 | 21 | 16 |
| 51 | 50 | 10 | 0 | 10 | 20 | -30 | 0 | 20 | 10 | 0 | 20 | 10 | 20 | 20 | 20 |
| 52 | 50 | 10 | 10 | 10 | 20 | -29.75 | 0.25 | 19 | 10.25 | 0.25 | 20.25 | 10.25 | 29 | 20.25 | 20.25 |
| 53 | 50 | 10 | 10 | 10 | 20 | -29.5 | 0.5 | 18 | 10.5 | 0.5 | 20.5 | 10.5 | 28 | 20.5 | 20.5 |
| 54 | 50 | 10 | 10 | 10 | 20 | -29.25 | 0.75 | 17 | 10.75 | 0.75 | 20.75 | 10.75 | 27 | 20.75 | 20.75 |
| 55 | 50 | 10 | 10 | 10 | 20 | -29 | 1 | 16 | 11 | 1 | 21 | 11 | 26 | 21 | 21 |
| 56 | 50 | 10 | 10 | 10 | 20 | -28.75 | 1.25 | 15 | 11.25 | 1.25 | 21.25 | 11.25 | 25 | 21.25 | 21.25 |
| 57 | 50 | 10 | 10 | 10 | 20 | -28.5 | 1.5 | 14 | 11.5 | 1.5 | 21.5 | 11.5 | 24 | 21.5 | 21.5 |
| 58 | 50 | 10 | 10 | 10 | 20 | -28.25 | 1.75 | 13 | 11.75 | 1.75 | 21.75 | 11.75 | 23 | 21.75 | 21.75 |
| 59 | 50 | 10 | 10 | 10 | 20 | -28 | 2 | 12 | 12 | 2 | 22 | 12 | 22 | 22 | 22 |
| 60 | 50 | 10 | 10 | 10 | 20 | -29 | 6 | 11 | 11 | 1 | 21 | 16 | 21 | 21 | 21 |

FIG. 8

RESULT OF EMOTION INFERENCE

DOMINANT EMOTION: "JOY"

(DETAILS: 40% FOR JOY, 20% FOR NEUTRAL,
15% FOR SURPRISE, 15% FOR ANGER, 10% FOR SADNESS)

EMOTION INFERENCE DEVICE, EMOTION INFERENCE METHOD, AND RECORDING MEDIUM

CROSS-REFERENCE OF RELATED APPLICATIONS

This application is the U.S. National Phase under 35 U.S.C. § 371 of International Patent Application No. PCT/JP2018/039713, filed on Oct. 25, 2018, which in turn claims the benefit of Japanese Application No. 2018-071994, filed on Apr. 4, 2018, the entire disclosures of which Applications are incorporated by reference herein.

TECHNICAL FIELD

The present disclosure relates to a technology for inferring emotions.

BACKGROUND ART

Emotion inference devices are conventionally known to infer an emotion of a subject (that is, a subject of emotion inference) by obtaining an image of the subject and recognizing an expression from the image (see Patent Literatures [PTLs] 1 and 2, for example).

CITATION LIST

Patent Literature

PTL 1: Japanese Unexamined Patent Application Publication No. 2014-178970
PTL 2: Japanese Unexamined Patent Application Publication No. 2016-149083

SUMMARY OF THE INVENTION

Technical Problem

Every subject has a different facial appearance, and the extent to which the subject expresses a true emotion outwardly varies for each subject. Thus, a conventional emotion inference device may not appropriately infer an emotion of the subject The present disclosure provides an emotion inference device capable of inferring an emotion of a subject appropriately (with high precision, for example) using a new method for emotion inference. The present disclosure also provides an emotion inference method and a non-transitory computer-readable recording medium embodied with an emotion inference program (that is, a computer program) used by the emotion inference device.

Solutions To Problem

In accordance with an aspect of the present disclosure, there is provided an emotion inference device that infers an emotion of a subject, the emotion inference device including: an obtainer that sequentially obtains an evaluation value group of the subject, the evaluation value group being a set of evaluation values corresponding to a plurality of emotion attributes of classified emotions, the evaluation value group including a first evaluation value group and a second evaluation value group; a processor that (i), on the basis of a relationship between the first evaluation value group obtained by the obtainer and the second evaluation value group obtained by the obtainer prior to the first evaluation value group, when a difference under a same emotion attribute between an evaluation value in the first evaluation value group and an evaluation value in the second evaluation value group does not exceed a predetermined criterion, performs a correction process to correct at least one of evaluation values in the first evaluation value group to reduce the evaluation value corresponding to the same emotion attribute in the first evaluation value group, and (ii) performs an inference process to infer the emotion of the subject on the basis of the first evaluation value group obtained as a result of the correction process, the inference process being a process in which an emotion attribute having a higher evaluation value among the plurality of emotion attributes is inferred more strongly as the emotion of the subject; and an outputter that outputs a result of the inference process performed by the processor.

In accordance with another aspect of the present disclosure, there is provided an emotion inference device that infers an emotion of a subject, the emotion inference device including: an obtainer that sequentially obtains an evaluation value group of the subject, the evaluation value group being a set of evaluation values corresponding to a plurality of emotion attributes of classified emotions, the evaluation value group including a first evaluation value group and a second evaluation value group; a processor that, on the basis of a relationship between the first evaluation value group obtained by the obtainer and the second evaluation value group obtained by the obtainer prior to the first evaluation value group, performs a correction process to: determine a correction value on the basis of whether a difference under a same emotion attribute between an evaluation value in the first evaluation value group and an evaluation value in the second evaluation value group exceeds a predetermined criterion; and correct, using the correction value, at least one of evaluation values in a third evaluation value group obtained by the obtainer subsequently to the first evaluation value group to change an evaluation value corresponding to the same emotion attribute in the third evaluation value group, and performs an inference process to infer the emotion of the subject on the basis of the third evaluation value group obtained as a result of the correction process, and an outputter that outputs a result of the inference process performed by the processor.

In accordance with still another aspect of the present disclosure, there is provided an emotion inference method of inferring an emotion of a subject, the emotion inference method including: sequentially obtaining an evaluation value group of the subject, the evaluation value group being a set of evaluation values corresponding to a plurality of emotion attributes of classified emotions, the evaluation value group including a first evaluation value group and a second evaluation value group; on the basis of a relationship between the first evaluation value group obtained in the obtaining and the second evaluation value group obtained in the obtaining prior to the first evaluation value group, when a difference under a same emotion attribute between an evaluation value in the first evaluation value group and an evaluation value in the second evaluation value group does not exceed a predetermined criterion, performing a correction process to correct at least one of evaluation values in the first evaluation value group to reduce the evaluation value corresponding to the same emotion attribute in the first evaluation value group; performing an inference process to infer the emotion of the subject on the basis of the first evaluation value group obtained as a result of the correction process performed in the performing of the correction process, the inference process being a process in which an emotion attribute having a relatively higher evaluation value among the plurality of emotion attributes relatively is inferred more strongly as the emotion of the subject; and outputting a result of the inference process performed in the performing of the inference process.

In accordance with still another aspect of the present disclosure, there is provided a non-transitory computer-readable recording medium embodied with a program for use in an emotion inference device, which includes a microprocessor and infers an emotion of a subject, the program causing the emotion inference device to execute: sequentially obtaining an evaluation value group of the subject, the evaluation value group being a set of evaluation values corresponding to a plurality of emotion attributes of classified emotions, the evaluation value group including a first evaluation value group and a second evaluation value group; on the basis of a relationship between the first evaluation value group obtained in the obtaining and the second evaluation value group obtained in the obtaining prior to the first evaluation value group, when a difference under a same emotion attribute between an evaluation value in the first evaluation value group and an evaluation value in the second evaluation value group does not exceed a predetermined criterion, performing a correction process to correct at least one of evaluation values in the first evaluation value group to reduce the evaluation value corresponding to the same emotion attribute in the first evaluation value group; performing an inference process to infer the emotion of the subject on the basis of the first evaluation value group obtained as a result of the correction process performed in the performing of the correction process, the inference process being a process in which an emotion attribute having a relatively higher evaluation value among the plurality of emotion attributes is inferred relatively more strongly as the emotion of the subject; and outputting a result of the inference process performed in the performing of the inference process.

Advantageous Effect of Invention

The emotion inference device, the emotion inference method, or the recording medium according to the present disclosure is capable of appropriately inferring an emotion of a subject.

BRIEF DESCRIPTION OF DRAWINGS

FIG. 3 illustrates an example of evaluation value groups associated with emotion attributes that are obtained by the emotion inference device.

FIG. 4 illustrates an example of an initial value of a correction value that is stored in the emotion inference device for each of the emotion attributes.

FIG. 6C is a flowchart illustrating an example of a correction process (operation example 3) performed by the emotion inference device.

FIG. 6E is a flowchart illustrating an example of a correction process (operation example 5) performed by the emotion inference device.

FIG. 6F is a flowchart illustrating an example of a correction process (operation example 6) performed by the emotion inference device.

FIG. 7 illustrates results of implementation obtained according to an implementation example of the emotion inference process.

FIG. 8 illustrates an example of a result of emotion inference outputted by the emotion inference device.

DESCRIPTION OF EXEMPLARY EMBODIMENTS

Figure 1:
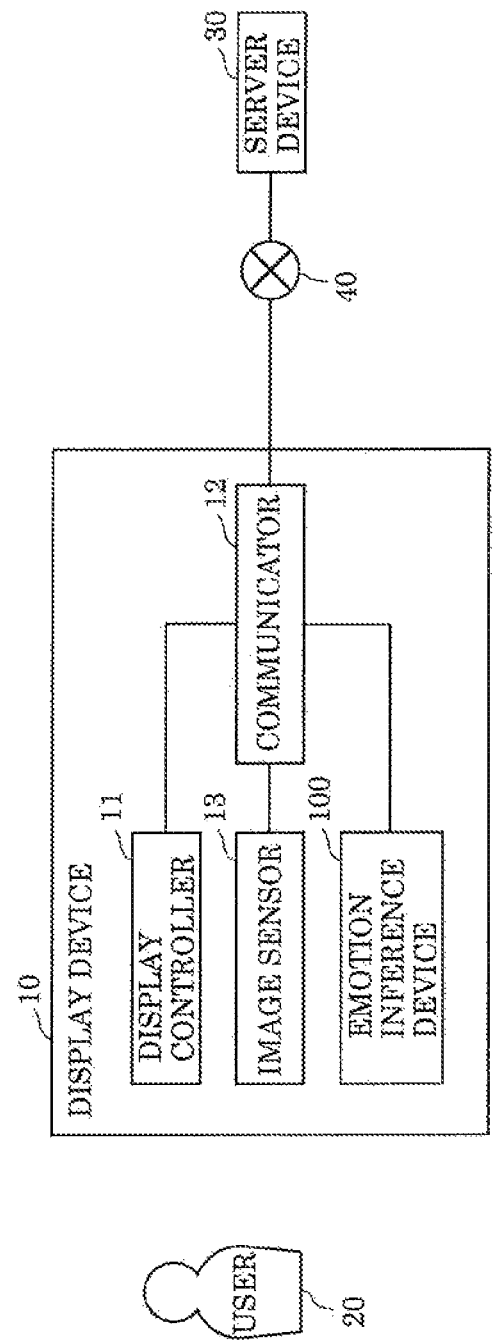
FIG. 1 illustrates an example of a configuration of a system including an emotion inference device according to Embodiment 1.

In order to appropriately infer an emotion of a subject, an emotion inference device according to an aspect of the present disclosure infers an emotion of a subject, including: an obtainer that sequentially obtains an evaluation value group of the subject, the evaluation value group being a set of evaluation values corresponding to a plurality of emotion attributes of classified emotions, the evaluation value group including a first evaluation value group and a second evaluation value group; a processor that (i) on the basis of a relationship between the first evaluation value group obtained by the obtainer and the second evaluation value group obtained by the obtainer prior to the first evaluation value group, when a difference under a same emotion attribute between an evaluation value in the first evaluation value group and an evaluation value in the second evaluation value group doe not exceed a predetermined criterion, performs a correction process to correct at least one of evaluation values in the first evaluation value group to reduce the evaluation value corresponding to the same emotion attribute in the first evaluation value group, and (ii) performs an inference process to infer the emotion of the subject on the basis of the first evaluation value group obtained as a result of the correction process, the inference process being a process in which an emotion attribute having a higher evaluation value among the plurality of emotion attributes is inferred more strongly as the emotion of the subject; and an outputter that outputs a result of the inference process performed by the processor.

With this configuration, arm emotion attribute, among the plurality (that is, multiple types) of emotion attributes of classified emotions, that is hidden by another emotion attribute having a higher evaluation value and less fluctuations may have a relatively significant influence on a result of the emotion inference. Thus, the emotion of the subject can be inferred appropriately.

These general and specific aspects may be implemented to a device, a system, a method, an integrated circuit, a computer program, or a computer-readable recording medium, or may be any combination of them.

Hereinafter, certain exemplary embodiments will be described in detail with reference to the accompanying Drawings. However, unnecessarily detailed description may be omitted. For example, detailed explanation of a well-known matter and repeated description of substantially identical structures may be omitted. Such omission makes the following description exclude unnecessary redundancy and be easily understood by those skilled in the art.

It should be noted that the accompanying drawings and subsequent description are provided by the inventors of the present disclosure to facilitate sufficient understanding of the present disclosure by those skilled in the art, and are thus not intended to limit the scope of the subject matter recited in the claims. The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment 1

The present embodiment describes an emotion inference system that includes display device 10 and server device 30, as an example of a system including an emotion inference device, with reference to the drawings.

1-1. Configuration of Emotion Inference System

FIG. 1 illustrates a configuration of the emotion inference system. This emotion inference system includes display device 10 and server device 30 that communicate with each other via communication channel 40. Communication channel 40 is communication network used for wired or wireless communications, for example. Although only one server device 30 is illustrated in this diagram, a plurality of server devices 30 that communicate with display device 10 may be disposed at a distance from each other. User 20 of display device 10 is a subject of emotion inference. This emotion inference system infers emotions of user 20 in response to displayed information. A result of the emotion inference performed on user 20 may be shown to user 20. Alternatively, the result may be collected by server device 30 in which a correlation between the displayed information and the result is analyzed, and then a result of the analysis may be used for various purposes. Or, the result of the emotion inference may be used for controlling a device, for example, to switch the information displayed on display device 10.

Display device 10 includes, in addition to a display, a computer that includes a processor, a recording medium (such as a memory or a hard disk), a communication interface (i.e., a communication circuit), and a user interface. Display device 10 may be a personal computer, a device like a stationary television receiver, or a portable tablet or smartphone, for example. Display device 10 has a functional configuration that includes display controller 11, communicator 12, image sensor 13, and emotion inference device 100.

Display controller 11 is implemented by a display (such as a liquid crystal display or an organic electro-luminescence [EL] display) and a control circuit, for example. Display controller 11 performs control so that an image is displayed on a display screen. For example, display controller 11 performs display control so that a video image or a still image received via communicator 12 is displayed on the display screen. The image may be any visual information, such as a photograph, characters, or graphics. Display controller 11 may have a web browser function, for example. Here, display controller 11 may perform control so that an image recorded on the recording medium included in display device 10 is displayed on the display screen.

Communicator 12 is implemented by a communication interface that performs wired or wireless communications with server device 30, for example. Server device 30 is, for example, a computer that has a function of transmitting an image displayed on the display by the display device 10 (such as a television broadcasting function or a web server function). Communicator 12 has a function of receiving an image to be displayed on the display and transmitting this image to display controller 11. Communicator 12 is implemented by a tuner that receives various television broadcasts or a network interface that accesses a website like the Internet. If a television image (or more specifically, video content from a television broadcast) is to be displayed on the display, user 20 may perform an operation on the tuner of communicator 12 for reception-channel selection via the user interface of display device 10, for example. Moreover, user 20 may perform an operation to specify information of, for example, a uniform resource locator (URL) (such as a network address of a website) on a network that specifies information of a webpage as an image to be displayed on the display, for example. Server device 30 has an emotion evaluation function achieved by, when receiving a face image as a result of sensing user 20 (or more specifically, an image showing a face of the subject), evaluating an emotion of the subject on the basis of the face image and then transmitting a result of the evaluation as a reply to a transmitter of the face image. This emotion evaluation function makes an evaluation of how much a facial expression of the face image expresses an emotion, far each of a plurality of emotion classes (referred to as emotion attributes) of classified emotions, using a technology similar to the one used by a conventional emotion inference device (such as the emotion inference device disclosed in PTL 1 or PTL 2). This evaluation process calculates an evaluation result (or more specifically, an evaluation value for each of the emotion attributes) through image processing or arithmetic processing, such as feature matching, on the basis of the obtained face image and information indicating features of the face image for each of the plurality of emotion attributes, for example. In the present embodiment, server device 30 transmits, in reply to the transmitter of the face image, an evaluation value group that is a set of evaluation values corresponding to the plurality of emotion attributes as the evaluation result. To use the emotion evaluation function of server device 30, communicator 12 further has functions of sequentially transmitting face images generated sequentially by image sensor 13 to server device 30, sequentially receiving evaluation value groups transmitted sequentially from server device 30 as evaluation results, and sequentially transmitting the evaluation value groups to emotion inference device 100.

Image sensor 13 is placed to image a view in front of the display of display device 10, for example. Image sensor 13 sequentially images the face of user 20 looking at the display, sequentially generates face images as sensing results, and transmitting the sensing results to communicator 12. For example, an imaging interval may be a few hundreds of milliseconds, a few seconds, or a few tens of seconds, and may not necessarily be fixed.

Emotion inference device 100 infers the emotion of user 20 that is a subject of emotion inference. For example, emotion inference device 100 is implemented by the computer included in display device 10. To be more specific, emotion inference device 100 implements an emotion inference method of inferring the emotion of the subject, by causing the processor to execute an emotion inference program stored in the memory.

1-2. Configuration of Emotion Inference Device

Figure 2:
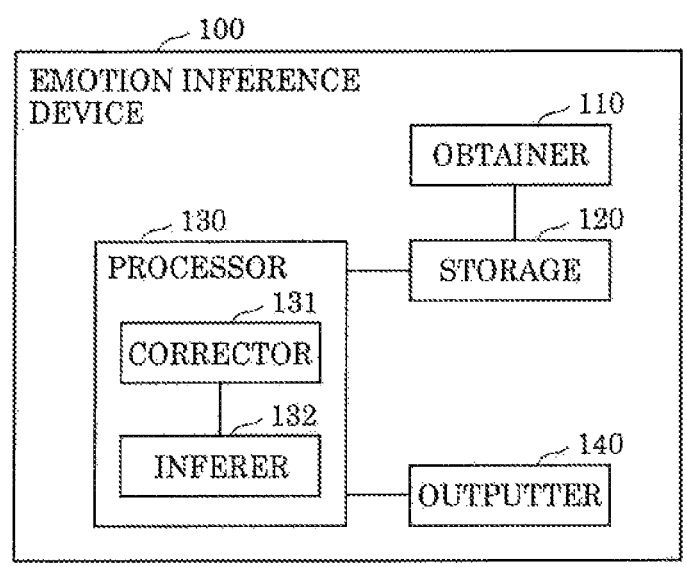
FIG. 2 is a block diagram illustrating a functional configuration of the emotion inference device according to Embodiment 1.

FIG. 2 is a block diagram illustrating a functional configuration of emotion inference device 100.

As illustrated in FIG. 2, emotion inference device 100 includes obtainer 110, storage 120, processor 130, and outputter 140.

Obtainer 110 has a function of sequentially obtaining the evaluation value groups of the subject. The evaluation value group is a set of evaluation values corresponding to the plurality of emotion attributes of classified emotions. Obtainer 110 stores the evaluation value groups, which are obtained sequentially, into storage 120. For example, obtainer 110 is implemented by a communication interface and a processor that executes a program. The program may be an application program or a part of an operating system (OS), for example. In the present embodiment, the subject (that is, the subject of emotion inference) is user 20. Obtainer 110 sequentially obtains the evaluation value groups via communicator 12 of display device 10. Each of the evaluation value groups is an evaluation result calculated by server device 30 on the basis of the sensing result (i.e., the face image) obtained by image sensor 13 that sequentially images user 20. Obtainer 110 may obtain the evaluation value groups at an interval that is not limited to a particular length. For example, the interval may be a few hundreds of milliseconds, a few seconds, a few tens of seconds, or a few minutes, and may not necessarily be fixed. In the present embodiment, five emotions, which are "neutral", "joy", "surprise", "anger", and "sadness", are used as examples of the emotion attributes (that is, examples of the plurality of emotion attributes of classified emotions) associated with the evaluation value group obtained by obtainer 110. However, these are merely examples and thus the number of classified emotions may be more than or less than five. Moreover, the emotion attributes may or may not correlate with each other. Each of the evaluation values of the plurality of emotion attributes in the evaluation value group obtained by obtainer 110 from server device 30 may be any value. For example, the evaluation value may be a percentage (%), a level, or the number of points that indicates a probability that the emotions of the subject user 20) contain the emotion attribute having this evaluation value. Alternatively, the evaluation value may be represented by a ranking level (for example, level 1 for the lowest ranking level and level 5 for the highest ranking level). In this case, the evaluation value with a higher percentage indicating a higher probability that the emotions of the subject contain this emotion attribute is given a higher ranking level. In the present embodiment, the evaluation value corresponding to any one of the emotion attributes included in the evaluation value group obtained sequentially by obtainer 110 is represented by a percentage (%) indicating a probability that the emotions of the subject contain this emotion attribute. Moreover, a sum of the evaluation values of all the emotion attributes in the evaluation value group is normalized to be a constant value (100% in this example) in the present embodiment.

Storage 120 stores a correction value for each of the plurality of emotion attributes of classified emotions. Storage 120 is one region of a storage medium, such as a memory, for storing the evaluation value groups obtained by obtainer 110. The storage medium is not limited to a memory, and may be a hard disk for example. The evaluation value groups obtained by obtainer 110 may be deleted after processor 130 does not require these groups in an inference process any longer. The correction value is used for calculation in a correction process performed by corrector 131 of processor 130. FIG. 3 illustrates an example of evaluation value groups associated with emotion attributes obtained by obtainer 110 of emotion inference device 100 and stored into storage 120. In the example of this diagram, an evaluation value group of an N-th round of evaluation (N is a natural number that is at least 1) obtained by obtainer 110 from server device 30 includes: an evaluation value of 50(%) for emotion attribute "neutral"; an evaluation value of 0(%) for emotion attribute "joy"; an evaluation value of 5(%) for emotion attribute "surprise"; an evaluation value of 15(%) for emotion attribute "anger"; and an evaluation value of 30(%) for emotion attribute "sadness". In this example, a sum of these evaluation values is 100%. FIG. 4 illustrates an example of an initial value of a correction value stored for each of the emotion attributes in storage 120. In the example of this diagram, the initial value of the correction value is zero (0) for each of the emotion attributes.

Processor 130 is implemented by an electronic circuit, such as a processor that executes a program. Processor 130 has a functional configuration that includes corrector 131 and inferer 132. In processor 130, corrector 131 performs a correction process and inferer 182 performs an inference process.

Corrector 131 performs the correction process. By this correction process, on the basis of a relationship between a first evaluation value group obtained by obtainer 110 and a second evaluation value group obtained by obtainer 110 prior to the first evaluation value group, if a difference under the same emotion attribute between an evaluation value in the first evaluation value group and an evaluation value in the second evaluation value group does not exceed a predetermined criterion, at least one of the evaluation values in the first evaluation value group is corrected so that the evaluation value of this emotion attribute in the first evaluation value group is reduced. Here, the second evaluation value group is either an evaluation value group without any change after obtained by obtainer 110 or an evaluation value group changed as a result of the already-executed correction process. To be more specific, to maintain the sum of the evaluation values in the first evaluation value group obtained as a result of the aforementioned correction process at the constant value (100%, for example), corrector 131 performs the correction process on the first evaluation value group by increasing, fore example uniformly (that is, adding the same value to) each of the evaluation values in the first evaluation value group other than the evaluation value reduced by the correction. Here, the comparison between the predetermined criterion and the difference between the evaluation values under the same emotion attribute in the two evaluation value groups sequentially obtained by obtainer 110 can be made through arithmetic processing that calculates a difference value, a ratio, or a differential (such as a value obtained by dividing the difference value by a time interval), for example. The difference between the evaluation values may be obtained by subtracting the lower ranking level from the higher ranking level among the ranking levels determined for the plurality of emotion attributes in descending order (or more specifically, may be a level difference between the ranking levels representing the evaluation values). The predetermined criterion to be compared with the difference may be a single value, such as 0 (zero), or may be a range, such as 1 to 2. Suppose that the predetermined criterion to be compared with the difference between the evaluation values is zero (that is, 0 used when the difference is represented by a difference value). In this case, if the evaluation values are the same, the difference may be determined as not exceeding the predetermined criterion. If the evaluation values are not the same, the difference may be determined as exceeding the predetermined criterion. Moreover when the predetermined criterion is 1, the difference between the evaluation values may be determined as not exceeding the predetermined criterion if the difference is 1 or less, and may be determined as exceeding the predetermined criterion if the difference is greater than 1. For instance, the predetermined criterion is within a small range (0 to 2, for example) in contrast to a range of values (0 to 100, for example) taken by the evaluation value. Suppose that: the difference between the evaluation values is obtained by subtracting the lower ranking level from the higher ranking level among the ranking levels determined for the plurality of emotion attributes in descending order (or more specifically, the difference is a level difference between the ranking levels representing the evaluation value); and the predetermined criterion is zero. In this case, if the ranking levels of these two evaluation values are the same, the difference between these values does not exceed the predetermined criterion. Here, an even more specific example of the correction process is described as follows. For example, suppose that a difference under the same emotion attribute between the highest evaluation value in the first evaluation value group obtained by obtainer 110 and the corresponding evaluation value in the second evaluation value group (for example, a level difference between the evaluation values represented by the ranking levels determined in descending order) does not exceed the predetermined criterion. In this case, corrector 131 performs the correction process to reduce the highest evaluation value and uniformly increase the evaluation values other than the highest evaluation value. For example, suppose that a difference under the same emotion attribute between an evaluation value in the first evaluation value group and an evaluation value in the second evaluation value group is 0 and, thus, that this difference does not exceed the predetermined criterion. In this case, corrector 131 may reduce the evaluation value of this emotion attribute in the first evaluation value group. An example in which the predetermined criterion is zero (0) and a difference between the ranking levels of the evaluation values under the same emotion attribute in the two evaluation value groups is observed is as follows. In this example, suppose that there is no difference under the same emotion attribute between the highest evaluation value in the first evaluation value group and the corresponding evaluation value in the second evaluation value group, that is, there is no difference under the same emotion attribute between the highest ranking level representing the highest evaluation value in the first evaluation value group and the ranking level representing the corresponding evaluation value in the second evaluation value group. In this case, the difference is determined as not exceeding the predetermined criterion. If the first evaluation value group has two or more highest evaluation values, the correction process may be performed by reducing each of these highest evaluation values and uniformly increasing the other evaluation values so that the sum of all the evaluation values is maintained at the constant value. As a specific example, corrector 131 performs the correction process by first initializing the correction values on the basis of the correction values corresponding to the emotion attributes as illustrated in FIG. 4. Then, if a difference under the same emotion attribute between the evaluation value in the first evaluation value group and the evaluation value in the second evaluation value group does not exceed the predetermined criterion for example, corrector 131 performs the correction process as follows. Corrector 131 first performs an update by reducing the correction value corresponding to this emotion attribute stored in storage 120, and then reduces the evaluation value of this emotion attribute in the first evaluation value group by adding the updated correction, value to this evaluation value.

Inferer 132 performs the inference process. On the basis of the evaluation value for each of the emotion attributes obtained as a result of the correction process, inferer 132 performs the inference process, which infers the emotion of the subject (i.e., user 20), by executing a predetermined processing algorithm (such as a combination of various calculations and a condition determination process). Then, inferer 132 transfers a result of the inference process to outputter 140. This inference process is a process to infer an emotion of the subject by inferring, an emotion attribute having a relatively higher evaluation value among the plurality of emotion attributes relatively more strongly as the emotion of the subject on the basis of the first evaluation value group obtained as a result of the correction process performed by corrector 131. More specifically, inferer 132 determines that the emotion attribute having a relatively higher evaluation value among the plurality of emotion attributes dominates the emotion of the subject more and thus performs the inference process so that the emotion attribute having the relatively higher evaluation value among the plurality of emotion attributes to significantly influence the result of the inference process. The result of the inference process transferred from inferer 132 to outputter 140 may be any type of signal or data. For example, the result may be transferred as character string data indicating an emotion attribute that is inferred as the emotion of the subject. For example, inferer 182 may infer, as the emotion of the subject, the emotion attribute having the highest evaluation value in the first evaluation value group obtained as a result of the correction process (such as "joy", if the emotion attribute having the relatively highest evaluation value is "joy"). Alternatively, emotion attributes corresponding to top N evaluation values (N is two, for example) ("joy" and "surprise" for instance) may be inferred as multiple emotions of the subject. Moreover, inferer 132 may infer, as the emotion of the subject, the set of the evaluation values of the emotion attributes in the first evaluation value group obtained as a result of the correction process, for example. In this case, an example of the result of the emotion inference performed on the subject may be "40% of neutral, 50% of joy, 10% of surprise, 0% of anger, and 0% of sadness".

Processor 130 may cause corrector 131 and inferer 132 to sequentially repeat the correction process and the inference process, respectively, by sequentially referencing to the evaluation value group, which is stored by obtainer 110 into storage 120 whenever obtained by obtainer 110. For example, after the inference process performed by inferer 132 on the basis of the first evaluation value group obtained as a result of the correction process performed by corrector 131, processor 130 may cause corrector 131, on the basis of a relationship between the first evaluation value group obtained as a result of the correction process and a third evaluation value group obtained by obtainer 110 subsequently to the first evaluation value group, to newly perform the correction process on the third evaluation value group. To be more specific, suppose that a difference under the same emotion attribute between an evaluation value in the first evaluation value group obtained after the correction process and a corresponding evaluation value in the third evaluation value group does not exceed the predetermined criterion. In this case, processor 130 may cause corrector 131 to newly perform the correction process by correcting at least one of the evaluation values in the third evaluation value group, thereby reducing the evaluation value of this emotion attribute in the third evaluation value group. In this case, processor 130 may further cause inferer 132 to newly perform the inference process, by inferring an emotion attribute having a relatively higher evaluation value among the plurality of emotion attributes relatively more strongly as the emotion of the subject on the basis of the third evaluation value group obtained as a result of the correction process.

Outputter 140 is implemented by a communication interface and a processor that executes a program, for example. Outputter 140 obtains the result of the inference process performed by inferer 132 of processor 130 and then outputs the obtained result to an external source of emotion inference device 100. This output process refers to transmission of a signal indicating information about the result of the inference process to the external source, for example. Outputter 140 of emotion inference device 100 included in display device 10 may cause the result of the inference process to be displayed on the display by transmitting this result to display controller 11 via communicator 12. Moreover, outputter 140 of emotion inference device 100 included in display device 10 may transmit the result of the inference process to server device 30 via communicator 12, for example.

1-3. Operation Performed by Emotion Inference Device

The following describes an operation performed by emotion inference device 100, which has the configuration as described above, to achieve the emotion inference method.

1-3-1. Emotion Inference Process

Figure 5:
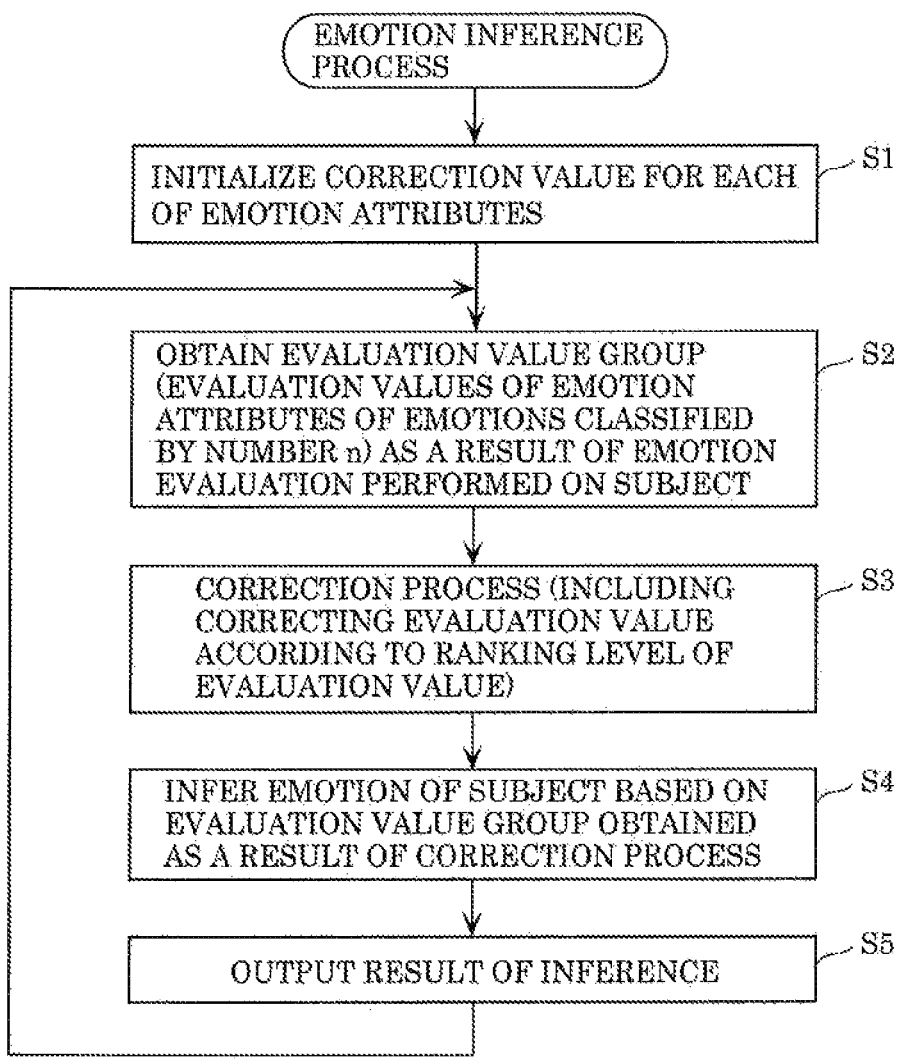
FIG. 5 is a flowchart illustrating an example of an emotion inference process performed by the emotion inference device.

FIG. 5 is a flowchart illustrating an example of the emotion inference process achieved as the emotion inference method performed by emotion inference device 100. The following describes the operation performed by emotion inference device 100, with reference to this diagram.

The emotion inference process is started when user 20, who is the subject of emotion inference, turns on display device 10 to activate the components (such as image sensor 13 and emotion inference device 100) included in display device 10, for example. In the present embodiment, image sensor 13 of display device 10 images a face of user 20, and the thereby generated face image is transmitted to server device 30. Here, the face image is transmitted whenever imaged, such as at intervals of a few seconds. Then, whenever receiving this captured image, server device 30 transmits the evaluation value group (that is, the evaluation values corresponding to the plurality of emotion attributes) to display device 10.

First, upon the start of the emotion inference process, corrector 131 of processor 130 performs an initialization process to initialize each of the correction values corresponding to the plurality of emotion attributes stored in storage 120 to 0 (Step S1).

Next, obtainer 110 obtains an evaluation value group as a result of the emotion evaluation performed on the subject (Step S2). For example, on the basis of the face image as a sensing result given by image sensor 13, server device 30 transmits an evaluation value group that is a set of evaluation values corresponding to the plurality of emotion attributes. Then, obtainer 110 obtains this evaluation value group via communicator 12. Obtainer 110 stores the evaluation value group sequentially obtained (see FIG. 3) into storage 120.

Following this, corrector 131 of process 130 performs the correction process (Step S3). For example, the correction process includes: updating of a correction value stored in storage 120; and correction of an evaluation value through calculation using the correction value. As an example of this correction process, the evaluation values are corrected on the basis of the ranking levels of these evaluation values of the emotion attributes in the evaluation value group. Examples of the operation performed in the correction process are described later.

Next, inferer 132 of processor 130 performs the inference process to infer the emotion of the subject on the basis of the evaluation value group (that is, the set of evaluation values corresponding to the emotion attributes) obtained as a result of the correction process performed by corrector 131 (Step S4). As an example of this inference process, the emotion attribute having the evaluation value at the highest ranking level in the evaluation value group is inferred as the emotion of the subject.

Following this, outputter 140 outputs a result of the inference process performed by inferer 132 (Step S5).

After Step S5, Step S2 is performed again to infer the emotion of the subject on the basis of the evaluation value group subsequently obtained by obtainer 110. Then, Steps S2 to S5 are repeated. Note that the inference process of inferer 132 may be performed after the correction process has been performed multiple times, or may be performed at any timing.

As described above, the correction process and the inference process are repeated in the emotion inference process. For example, the emotion inference process is performed as follows if, after the initialization process is performed on the correction values, there is no difference under the same emotion attribute between the highest ranking level representing the level of the highest evaluation value in the first evaluation value group obtained by obtainer 110 and the ranking level representing the level of the corresponding evaluation value in the second evaluation value group obtained by obtainer 110 prior to the first evaluation value group. In this emotion inference process, the correction process is performed as follows. The correction value corresponding to the emotion attribute having the highest evaluation value is reduced. Next, the correction values corresponding to the emotion attributes having the evaluation values other than the highest evaluation value in the first evaluation value group are uniformly increased so that the sum of the correction values corresponding to the plurality of emotion attributes is 0. Then, the correction values corresponding to the emotion attributes are added to the respective evaluation values of the emotion attributes in the first evaluation value group. After this, the inference process in this emotion inference process is performed on the basis of the first evaluation value group obtained as a result of this correction process. Moreover, the emotion inference process is performed as follows if there is no difference between the highest ranking level representing the level of the highest evaluation value of the corresponding emotion attribute in the first evaluation value group obtained as a result of the correction process and the ranking level representing the level of the evaluation value of this emotion attribute in the third evaluation value group obtained by obtainer 110 subsequently to the first evaluation value group. In this emotion inference process, the correction process is further performed as follows. The correction value of this emotion attribute in the third evaluation value group is reduced. Next, the correction values other than this reduced correction value are uniformly increased so that the sum of the correction values corresponding to the plurality of emotion attributes is 0. Then, the correction values corresponding to the emotion attributes are added to the respective evaluation values of the emotion attributes in the third evaluation value group. After this, the inference process is further performed on the basis of the third evaluation value group obtained as a result of this correction process.

As another example, the emotion inference process may be performed as follows if after the initialization process is performed on the correction values, there is no difference under the same emotion attribute between the highest ranking level representing the level of the highest evaluation value in the first evaluation value group obtained by obtainer 110 and the ranking level representing the level of the corresponding evaluation value in the second evaluation value group obtained by obtainer 110 prior to the first evaluation value group. In this emotion inference process, the correction process may be performed as follows. The correction values corresponding to the emotion attributes may be determined for reducing the correction value corresponding to the emotion attribute having the highest evaluation value and then for uniformly increasing the correction values corresponding to the emotion attributes having the evaluation values other than the highest evaluation value in the first evaluation value group so that the sum of the correction values corresponding to the plurality of emotion attributes is 0. After this, the aforementioned correction values corresponding to the emotion attributes may be added to the respective evaluation values of the emotion attributes in the third evaluation value group obtained by obtainer 110 subsequently to the first evaluation value group. In this case, the inference process may be performed in the emotion inference process on the basis of the third evaluation value group obtained as a result of this correction process. For example, the correction values corresponding to the emotion attributes may be determined by sequentially updating the correction values determined for the plurality of evaluation value groups sequentially obtained. Then, by using these correction values, the correction process may be performed on an evaluation value group that is newly obtained.

Hereafter, operation examples 1 to 6 of the correction process performed in Step S3 are described with reference to FIG. 6A to 6IF. In the following, the correction process is performed whenever obtainer 110 of display device 10 obtains the evaluation value group from server device 30 in association with the imaging of the face of user 20. To be more specific, the correction process is performed whenever the evaluation value group is obtained and stored into storage 120. Before a first round of the correction process, each of the correction values (that is, each of the correction values corresponding to the emotion attributes stored in storage 120) is initialized as illustrated in FIG. 4.

1-3-2. Operation Example 1 of Correction Process

Figure 6A:
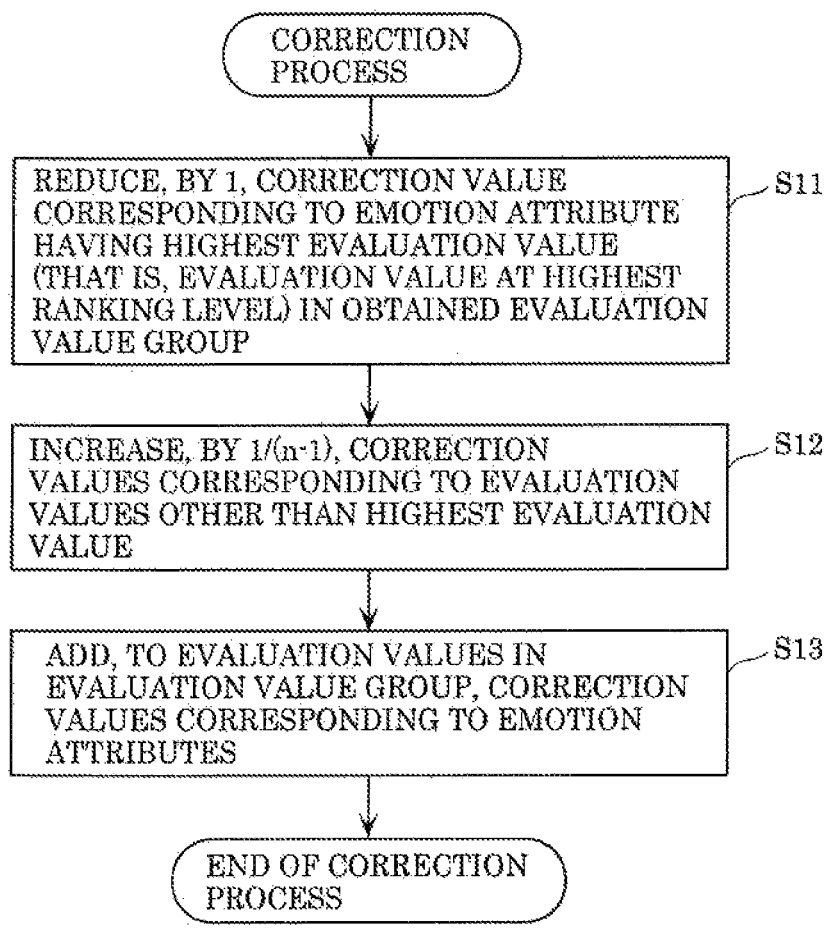
FIG. 6A is a flowchart illustrating an example of a correction process (operation example 1) performed by the emotion inference device.

FIG. 6A is a flowchart illustrating an example of the correction process (operation example 1) performed by corrector 131 of processor 130 in Step S3 of FIG. 5. Operation example 1 of the correction process is described as follows, with reference to FIG. 6A.

Corrector 131 reduces, by 1, the correction value corresponding to the emotion attribute having the highest evaluation value (that is, the evaluation value at the highest ranking level) in the latest evaluation value group obtained by obtainer 110 and stored into storage 120 (Step S11).

Moreover, corrector 131 increases, by $1/(n-1)$, the correction values corresponding to the emotion attributes having the evaluation values other than the highest evaluation value (Step S12). Here, "n" represents the number of emotion attributes of classified emotions. In the present example, the number of emotion attributes is 5 as illustrated in FIG. 3 and FIG. 4. As a result of reducing the correction value in Step S11 and increasing the correction values in Step S12, the correction values stored in storage 120 are updated.

Next, corrector 131 adds, to the evaluation values in the latest evaluation value group obtained by obtainer 110 and stored into storage 120, the respective correction values corresponding to the emotion attributes associated with these evaluation values and obtained as a result of calculations in Steps S11 and S12 (that is, the correction values currently stored in storage 120) (Step S13).

Thus, the evaluation value group obtained by obtainer 110 is changed as a result of the correction process. The evaluation value group obtained as a result of the correction process is transferred to inferer 132 to be used for the inference process (Step S4 in FIG. 5). Note that the evaluation value group obtained as a result of the correction process may be stored into storage 120.

1-3-3. Operation Example 2 of Correction Process

Figure 6B:
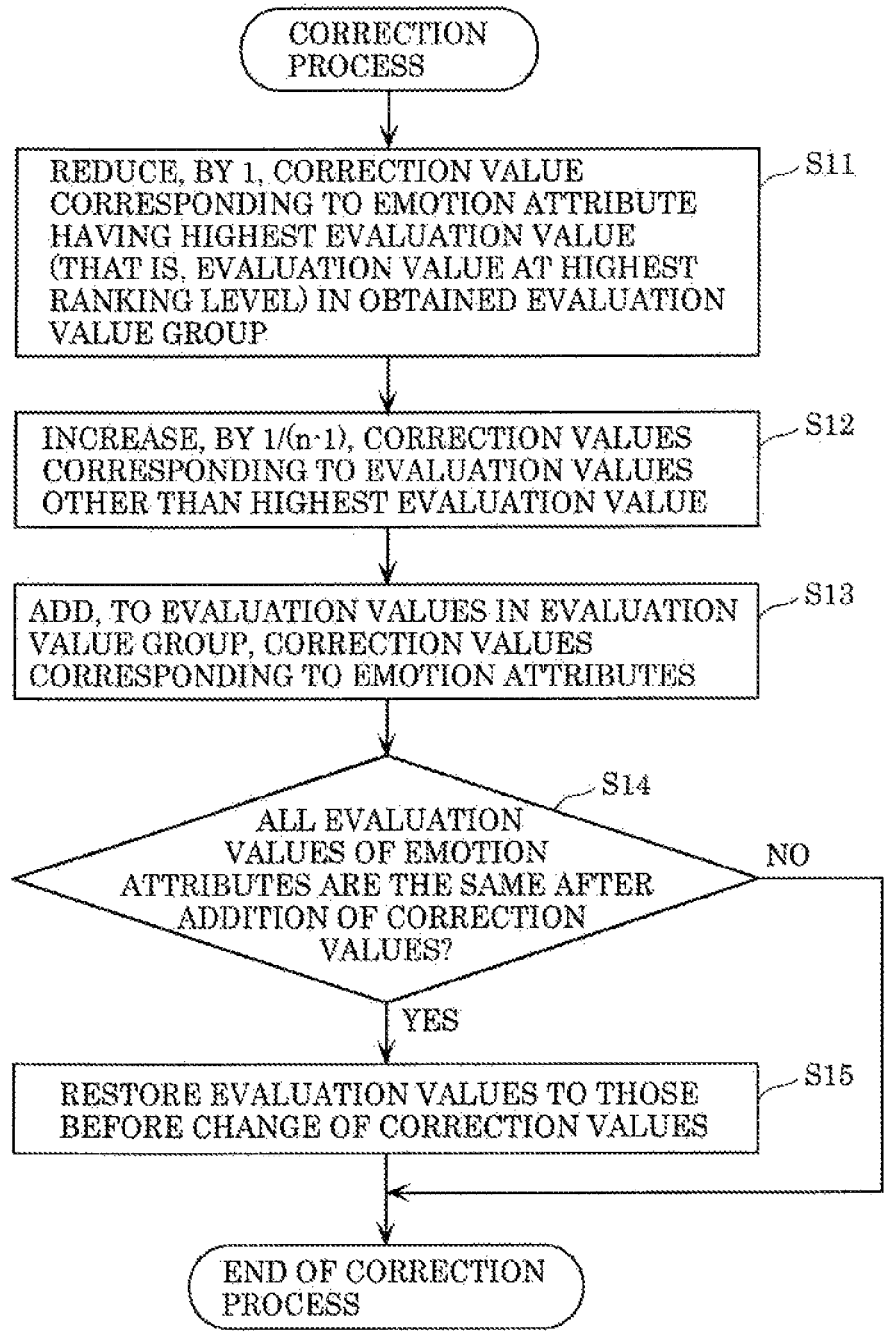
FIG. 6B is a flowchart illustrating an example of a correction process (operation example 2) performed by the emotion inference device.

FIG. 6B is a flowchart illustrating an example of the correction process (operation example 2) performed by corrector 131 of processor 130 in Step S3 of FIG. 5. Operation example 2 of the correction process is described as follows, with reference to FIG. 6B. Steps S11 to S13 are the same as those illustrated in FIG. 6A, and thus these steps are omitted from the following description as appropriate.

Corrector 131 reduces, by 1, the correction value corresponding to the emotion attribute having the highest evaluation value in the evaluation value group obtained in one round (Step S11). Following this, corrector 131 increases, by $1/(n-1)$, the correction values corresponding to the other emotion attributes (Step S12). Then, corrector 131 adds, to the evaluation values in the obtained evaluation value group, the respective correction values corresponding to the emotion attributes associated with these evaluation values (Step S13).

Next, corrector 131 determines whether all the evaluation values of the emotion attributes in the evaluation value group obtained in one round are the same after the addition of the correction values in Step S13 (Step S14).

If determining in Step S14 that all the evaluation values are the same, corrector 131 restores the evaluation values to those before the change of the correction values (or more specifically, before the correction values are updated in Steps S11 and S12) (Step S15) and ends the correction process. If determining in Step S14 that all the evaluation values are not the same (that is, not all the evaluation values match to each other), corrector 131 skips Step S15 and ends the correction process.

1-3-4. Operation Example 3 of Correction Process

FIG. 6C is a flowchart illustrating an example of the correction process (operation example 3) performed by corrector 131 of processor 130 in Step S3 of FIG. 5. Operation example 3 of the correction process is described as follows, with reference to FIG. 6C.

Corrector 131 determines whether all the evaluation values in the evaluation value group obtained as a result of the correction process performed the last time (that is, obtained after the correction process is performed on the evaluation value group the last time) are the same (Step S16).

If determining in Step S16 that all the evaluation values in the evaluation value group obtained as a result of the correction process performed last time are not the same (or more specifically, if two or more of the evaluation values are different from each other), corrector 131 reduces, by 1, the correction value corresponding to the emotion attribute having the highest evaluation value (that is, the evaluation value at the highest ranking level) in the evaluation value group obtained as a result of the correction process performed the last time (Step S17).

Next, corrector 131 increases, by $1/(n-1)$, the correction values corresponding to the emotion attributes having the evaluation values other than the highest evaluation value in the evaluation value group obtained as a result of the correction process performed the last time. The present example has only one highest evaluation value. However, if the number of highest evaluation values is m, which is two or more, for example, the correction values corresponding to the emotion attributes having the evaluation values other than the highest evaluation values may be increased by $m/(n-m)$.

Next, corrector 131 corrects the evaluation value group obtained by obtainer 110 this time (Step S19). To be more specific, corrector 131 adds, to the evaluation values in the evaluation value group obtained this time, the respective correction values corresponding to the emotion attributes associated to these evaluation values. Then, corrector 131 ends the correction process.

If determining in Step S14 that all the evaluation values in the evaluation value group obtained as a result of the correction process performed the last time are the same, corrector 131 skips Steps S17 and S18 (without changing the correction values). Then, corrector 131 corrects the evaluation value group in Step S19, and ends the correction process.

1-3-5. Operation Example 4 of Correction Process

Figure 6D:
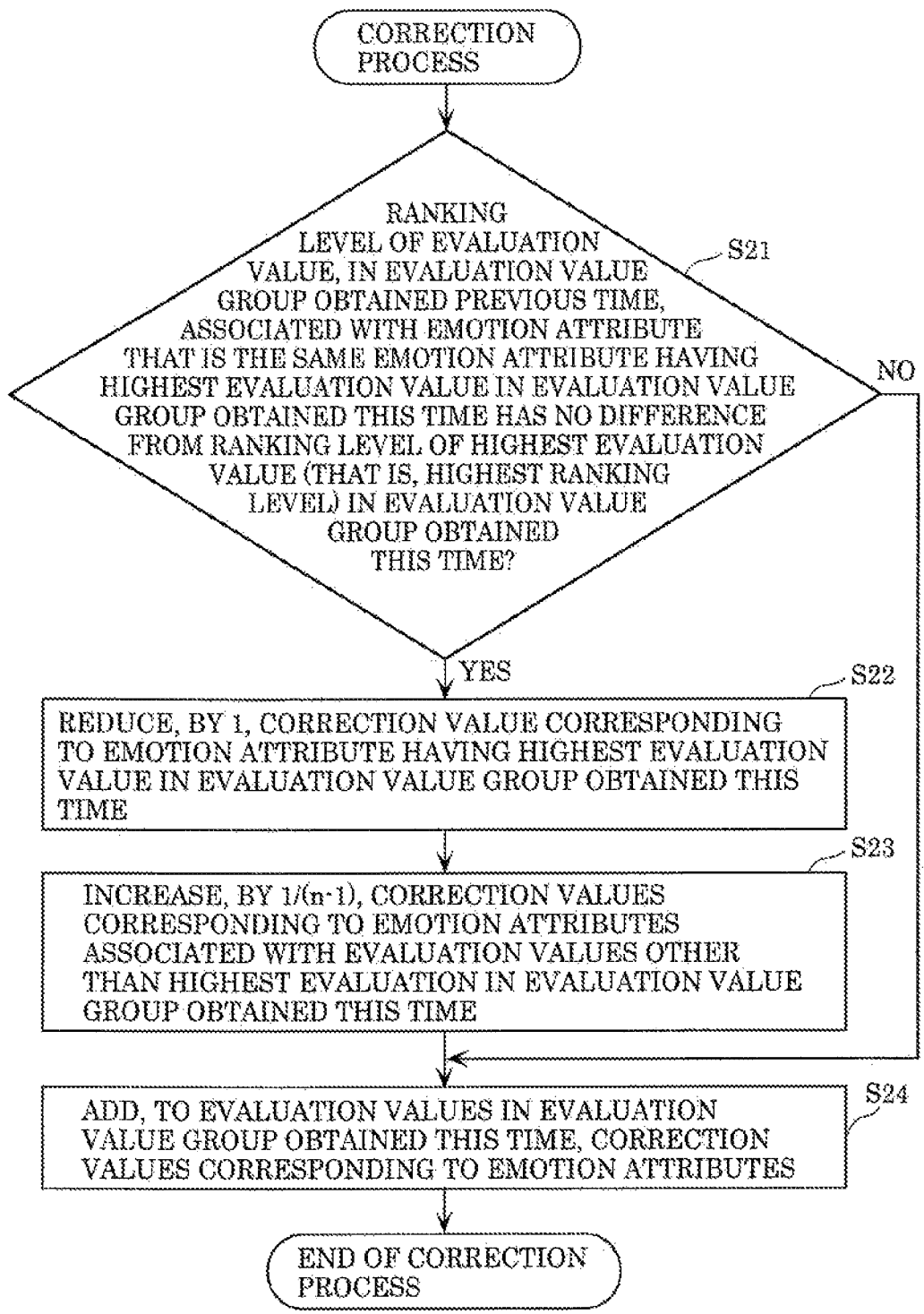
FIG. 6D is a flowchart illustrating an example of a correction process (operation example 4) performed by the emotion inference device.

FIG. 6D is a flowchart illustrating an example of the correction process (operation example 4) performed by corrector 131 of processor 130 in Step S3 of FIG. 5. Operation example 4 of the correction process is described as follows, with reference to FIG. 6D. In the following, the latest evaluation value group obtained by obtainer 110 is referred to as the evaluation value group obtained this time, and the evaluation value group obtained prior to this latest evaluation value group is referred to as the evaluation value group obtained the previous time.

Corrector 131 determines whether there is a difference under the same emotion attribute between the ranking level of the highest evaluation value (i.e., the highest ranking level) in the evaluation value group obtained this time and the ranking level of the corresponding evaluation value in the evaluation value group obtained the previous time (Step S21). This determination is similar to a determination of whether the emotion attributes are the same between the evaluation values with the highest ranking levels in the respective groups obtained this time and the previous time. If making the determination in the negative in Step S21, corrector 131 skips Steps S22 and S23. Here, if the correction process has been performed by corrector 131 on the evaluation value group obtained the previous time, the determination in Step S21 may be made for this group using the evaluation value group obtained as a result of this correction process.

If determining in Step S21 that there is no difference under the same emotion attribute between the ranking level of the highest evaluation value in the evaluation value group obtained this time and the ranking level of the evaluation value in the evaluation value group obtained the previous time, corrector 131 reduces, by 1, the correction value corresponding to the emotion attribute having the highest evaluation value in the evaluation value group obtained this time (Step S22). The present operation example has only one highest evaluation value for the purpose of description.

After Step S22, corrector 181 uniformly increases, by $1/(n-1)$, the correction values corresponding to the emotion attributes having the evaluation values other than the highest evaluation value in the evaluation value group obtained this time (Step S23).

After Step S23 or if making the determination in the negative in Step S21, corrector 131 adds, to the evaluation values in the evaluation value group obtained this time, the respective correction values corresponding to the emotion attributes associated with these evaluation values (Step S24). Then, corrector 131 ends the correction process. Note that the evaluation value group obtained as a result of the correction process is transferred to inferer 132 to be used for the inference process (Step S4 in FIG. 5).

1-3-6. Operation Example 5 of Correction Process

FIG. 6E is a flowchart illustrating an example of the correction process (operation example 5) performed by corrector 131 of processor 130 in Step S3 of FIG. 5. Operation example 5 of the correction process is described as follows, with reference to FIG. 6E.

Corrector 131 determines whether the evaluation value groups obtained this time and the previous time share any emotion attribute under which a difference between the corresponding evaluation values does not exceed the predetermined criterion (Step S31). This determination is similar to a determination of whether the emotion attributes in the two groups include the same emotion attribute under which a difference between the corresponding two evaluation values, obtained sequentially, does not exceed the predetermined criterion. If making the determination in the negative in Step S31, corrector 131 skips Steps S32 and S33.

If determining in Step S31 that the evaluation value groups obtained this tune and the previous time share an emotion attribute under which the difference between the corresponding evaluation values does not exceed the predetermined criterion corrector 131 reduces, by 1, the correction value corresponding to this emotion attribute under which the aforementioned difference does not exceed the predetermined criterion (Step S32). Here, the predetermined criterion is 0 (zero), or 1 to 2, for example. If the predetermined criterion is zero and the aforementioned difference is not present, this difference does not exceed the predetermined criterion. In contrast, if the aforementioned difference is present, this difference exceeds the predetermined criterion. If any emotion attribute under which the difference between the corresponding evaluation values does not exceed the predetermined criterion is included, the number of such emotion attributes is one or at least two.

Suppose that the number of such emotion attributes under which the aforementioned difference between the corresponding evaluation values does not exceed the predetermined criterion is m. After Step S32 in this case, corrector 131 increases, by m(n−m), each of the correction values corresponding to the other (n−m) emotion attributes (that is, the emotion attributes under which the aforementioned difference exceeds the predetermined criterion) (Step S33).

After Step S33 or if making the determination in the negative in Step S31, corrector 131 adds, to the evaluation values in the evaluation value group obtained this time, the respective correction values corresponding to the emotion attributes associated with these evaluation values (Step S34). Then, corrector 131 ends the correction process. Note that the evaluation value group obtained as a result of the correction process is transferred to inferer 132 to be used for the inference process (Step S4 in FIG. 5).

1-3-7. Operation Example 6 of Correction Process

FIG. 6F is a flowchart illustrating an example of the correction process (operation example 6) performed by corrector 131 of processor 130 in Step S3 of FIG. 5. Operation example 6 of the correction process is described as follows, with reference to FIG. 6F. The use of the correction values corresponding to the emotion attributes as illustrated in FIG. 4 is omitted from operation example 6.

Corrector 131 determines whether the evaluation value groups obtained this time and the previous time share any emotion attribute under which a difference between the corresponding evaluation values does not exceed the predetermined criterion (Step S41). Step S41 is the same as Step S31 of FIG. 6E.

If making the determination in the negative in Step S41, corrector 131 skips Steps S42 and S43. Then, corrector 131 ends the correction process.

If determining in Step S41 that the evaluation value groups obtained this time and the previous time share any emotion attribute under which the difference between the corresponding evaluation values does not exceed the predetermined criterion, corrector 131 reduces, by a predetermined value, the evaluation value obtained this time corresponding to this emotion attribute under which the difference that does not exceed the predetermined criterion (Step S42). Here, the predetermined criterion is 0 (zero), for example. If there is no difference under the same emotion attribute between the evaluation values obtained this time and the previous time, this difference does not exceed the predetermined criterion. Thus, the evaluation value obtained this time is reduced by the predetermined value in Step S42. The predetermined value may be any predetermined numeric value that is relatively small with respect to the maximum value to be taken by an evaluation value, and may be 1 for example. If the aforementioned difference is present, this difference exceeds the predetermined criterion.

After Step S42, corrector 131 uniformly increases the evaluation values other than the evaluation value having the aforementioned difference that does not exceed the predetermined criterion so that the sum of the evaluation values in the evaluation value group obtained this time is a predetermined constant value (100, for example) (Step S43). Then, corrector 131 ends the correction process. The evaluation value group obtained as a result of the correction process is transferred to inferer 132 to be used for the inference process (Step S4 in FIG. 5).

If all the evaluation values in the evaluation value group become the same value as a result of the correction process in operation example 6, corrector 131 of processor 130 may not perform the correction process on this evaluation value group, instead of performing the corresponding processes in operation example 2 (Steps S14 and S15 in FIG. 6B).

1-4. Implementation Example

FIG. 7 illustrates a table showing data of implementation results obtained according to an implementation example of the emotion inference process. The data in this table records, whenever an evaluation value group is obtained and the correction process is performed: the evaluation value group obtained by obtainer 110 of emotion inference device 100 (on the left side of the table); correction values corresponding to the emotion attributes stored in storage 120 an the middle of the table); and an evaluation value group obtained as a result of the correction process performed by corrector 131 (on the right side of the table). This data shows the results of the correction process performed in operation example 3 described above.

The sum of the evaluation values of the emotion attributes "neutral", "joy", "surprise", "anger", and "sadness" in an evaluation value group of one round is 100. For a first round, the correction values corresponding to the emotion attributes "neutral", "joy", "surprise", "anger", and "sadness" are initialized to 0.

For second round, the evaluation value of the emotion attribute "neutral" in the obtained evaluation value group is the highest. Thus, the correction value corresponding to "neutral" is reduced to −1 by subtraction of 1, and the correction values corresponding to the other emotion attributes are uniformly increased by 0.25. The sum of the correction values corresponding to the five emotion attributes is 0.

In each of the evaluation value groups obtained sequentially, the evaluation value of the emotion attribute "neutral" is the highest. However, in the evaluation value groups obtained as a result of the correction process in 31th and subsequent rounds, the evaluation value of the emotion attribute "joy" is the highest. This leads to that 'joy' is inferred as the dominant emotion of the subject as the result of the inference process.

In the table of FIG. 7, all the evaluation values of the emotion attributes in the evaluation value group obtained as a result of the correction process of a 30th round are the same value, which is 20. Thus, Steps S17 and S18 performed to change the correction values as described with reference to FIG. 6C are skipped. As a result, the correction values corresponding to the five emotion attributes are the same between the 30th round and a 31st round. For the 29th round, the evaluation value group obtained as a result of the correction process includes four highest values, which are 21, for the four emotion attributes except for "joy". As compared with the correction values for a 29th round, each of the correction values corresponding to these four emotion attributes is reduced by 1 and the correction value corresponding to the emotion attribute "joy" is increased by 4 to maintain the sum of the correction values at 0 for the 30th round.

1-5. Results of Emotion Inference

FIG. 8 illustrates an example of a result of the emotion inference outputted by outputter 140 of emotion inference device 100 (that is, a result of the inference process performed by inferer 132).

The example of the result of the emotion inference in this diagram indicates that the emotion attribute having the highest evaluation value in the evaluation value group is the dominant emotion. In addition to this, the result also indicates the evaluation value for each of the emotion attributes.

1-6. Advantageous Effects Etc.

Suppose, for example, that the same specific emotion attribute (such a "neutral") has the highest evaluation value (i.e., the evaluation value at the highest ranking level) in a row in the evaluation value groups sequentially obtained by obtainer 110 in emotion inference device 100. In this case, each time the correction process is performed, the evaluation value of this specific emotion attribute is reduced and the evaluation values of the other emotion attributes are relatively increased. This resultantly enables emotion inference device 100 to infer a true emotion attribute, which has been hidden by the specific emotion attribute, as the emotion making up a large proportion among the emotions of the subject.

Emotion inference device 100 reduces the evaluation value of the emotion attribute having less fluctuations so that, when a small emotional change occurs, this emotion can be appropriately inferred. For example, even if the subject pretends to have a specific emotion, such as "neutral", and the facial expression of the subject shows little change, emotion inference device 100 is capable of inferring the true emotion appropriately. Moreover, even if the subject has a facial appearance that seems to show a specific emotion regardless of inner feeling of the subject, emotion inference device 100 is capable of, based on that the evaluation value of the emotion attribute corresponding to this outward expression has less fluctuations, performing the correction process to reduce this evaluation value. As a result, the true emotion of the subject can be inferred appropriately. Operation examples 1 to 4 of the correction process are based on that: the emotion attribute having the highest evaluation value in the evaluation value group significantly influences a result of the emotion inference: and the emotion attribute having the highest evaluation value in the evaluation value group obtained for the subject having a specific facial appearance or pretending to have a specific emotion has less fluctuations in light of these, determination of whether there is a difference between the emotion attributes having the highest evaluation values in the evaluation value groups is omitted from operation examples 1 to 4. This is because these highest evaluation values are regarded as being of the same emotion attribute.

By the inference process performed by inferer 132 of emotion inference device 100, the emotion attribute having a relatively higher evaluation value is inferred more strongly as the emotion of the subject. On this account, normalization of the evaluation values of the emotion attributes within a contrastable range is useful as in the above example where the sum of all the evaluation values in the evaluation value group is kept at a constant value (such as 100%).

Embodiment 2

The present embodiment describes an example of an emotion inference device that calculates an evaluation value group, which is a set of evaluation values corresponding to a plurality of emotion attributes of classified emotions of a subject, with reference the drawings.

2-1. Configuration of Emotion Inference Device

Figure 9:
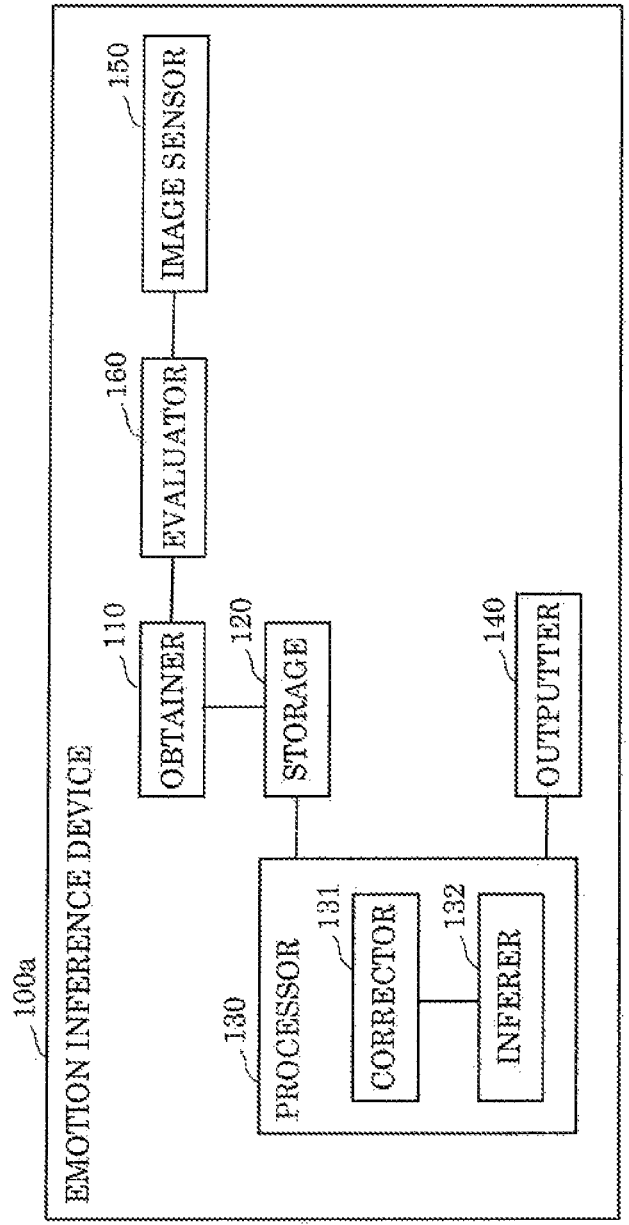
FIG. 9 is a block diagram illustrating a functional configuration of an emotion inference device according to Embodiment 2.

FIG. 9 is a block diagram illustrating a functional configuration of emotion inference device 100a.

Emotion inference device 100a performs an emotion inference process on a user that is a subject of emotion inference. Emotion inference device 100a includes a computer that includes a processor, a recording medium (such as a memory or a hard disk), a communication interface (i.e., a communication circuit), a user interface, and an image sensor. For example, the user interface includes a display and a touch panel that includes a touchpad overlaying a screen of the display. Emotion inference device 100a may be a smartphone, a tablet, or a personal computer, for example. Emotion inference device 100a implements an emotion inference method of inferring the emotion of the subject, by causing the processor to execute an emotion inference program stored in the memory.

In addition to the same components included in emotion inference device 100 described in Embodiment 1, emotion inference device 100a further includes image sensor 150 and evaluator 160. The components in FIG. 9 that are the same as those described in Embodiment 1 are assigned the same reference marks as used in FIG. 2, and are emitted from the following description as appropriate.

Image sensor 150 generates an image through imaging. To be more specific, image sensor 150 is a camera. Image sensor 150 images the subject to generate a face image of the subject (or more specifically, an image showing the face of the subject), and then transfers the face image to evaluator 160. Image sensor 150 sequentially performs imaging at an imaging interval of a few seconds or a few tens of seconds, for example, and then transfers the generated face image to evaluator 160 for each imaging operation.

Evaluator 160 is implemented by a processor that executes a program, for example. Evaluator 160 has an emotion evaluation function achieved by, when receiving a face image, evaluating emotions of the subject on the basis of the face image and then transmitting, to obtainer 110, an evaluation value group that is a set of evaluation values corresponding to the plurality of emotion attributes of classified emotions as a result of the evaluation. This emotion evaluation function is similar to the emotion evaluation function of server device 30 described in Embodiment 1. For example, evaluator 160 makes an evaluation by calculating an evaluation value group through image processing or arithmetic processing, such as feature matching, on the basis of the face image generated by image sensor 150 and information indicating features of the face image for each of the plurality of emotion attributes. If the face image shows a distinctive expression of one emotion attribute more than any other emotion attributes, the evaluation value of this emotion attribute is relatively higher. As in Embodiment 1, the plurality of emotion attributes represent five emotions, which are "neutral", "joy", "surprise", "anger", and "sadness". However, a total number and types of the emotion attributes are not limited to those described above. For example, the information indicating the features of the face image for each of the emotion attributes that is to be used for image feature matching is well known. Examples of such information include: information for "joy" indicating that the cheeks and both corners (i.e., the right and left corners) of the mouth are pulled upwardly (i.e., toward the top of head); information for "anger" indicating that the upper eyelids are raised; and information for "sadness" indicating that the upper eyelids and both corners of the mouth are pulled downwardly.

Each of the evaluation values of the plurality of emotion attributes in the evaluation value group obtained as a result of the evaluation performed by evaluator 160 may be any value. For example, the evaluation value may be represented by a percentage (%), a level, or the number of points that indicates a probability that the emotions of the subject contain the emotion attribute having this evaluation value. For example, the evaluation value corresponding to any one of the emotion attributes included in the evaluation value group obtained as a result of the evaluation performed by evaluator 160 is represented by a percentage (%) indicating a probability that the emotions of the subject contain this emotion attribute. Moreover, a sum of the evaluation values of all the emotion attributes in the evaluation value group is normalised to be a constant value (100% in this example).

Obtainer 110 sequentially obtains the evaluation value groups, each of which is a result of the evaluation performed by evaluator 160, and then stores the obtained evaluation value groups into storage 120. For example, obtainer 110 is implemented by a processor that executes a program. Obtainer 110 may obtain the evaluation value groups at an interval of a few seconds or a few tens of seconds, for example. This interval may not necessarily be the same as the imaging interval of imaging sensor 150.

Storage 120 stores a correction value for each of the plurality of emotion attributes of classified emotions. Storage 120 is one region of a storage medium, such as a memory, for storing the evaluation value groups obtained by obtainer 110.

Processor 130 is implemented by a processor that executes a program, for example. Processor 130 includes corrector 131 that performs a correction process and inferer 132 that performs an inference process.

Outputter 140 is implemented by a processor that executes a program, for example. Outputter 140 obtains the result of the inference process performed by inferer 132 and then outputs the obtained result of the inference process. This output of the result of the inference process refers to transmission of a signal indicating information about the result of the inference process to an external device, for example. If emotion inference device 100a includes a display, this output of the result of the inference process may be achieved by causing the display to display the result of the inference process such as the information illustrated as an example in FIG. 8). Moreover, for a program process in which a displayed image is changed on the basis of the information indicating the result of the inference process, the output of the result of the inference process may be achieved by transmitting this information.

2-2. Operation Performed by Emotion Inference Device

Emotion inference device 100a having the configuration described above performs the emotion inference process illustrated in FIG. 5. Emotion inference device 100a may perform, as the correction process in Step S3 of FIG. 5, the process illustrated in any one of FIG. 6A to FIG. 6F. Note that the evaluation value group obtained by obtainer 110 of emotion inference device 100a in Step S2 of FIG. 5 refers to the evaluation value group that is sequentially generated by evaluator 160 as the result of the evaluation based on the image generated through imaging by image sensor 150.

2-3. Advantageous Effects Etc.

Emotion inference device 100a is capable of inferring the emotion of the subject and outputting the result of the inference, without using an external device like server device 30. As with emotion inference device 100, emotion inference device 100a also performs the correction process to reduce influence over the result of the emotion inference exerted by an emotion attribute having an evaluation value with less fluctuations. This allows the true emotion to be appropriately inferred even if the subject pretends to have a specific emotion or the facial expression of the subject shows little change.

Other Embodiments Etc.

Embodiments 1 and 2 have been described thus far as examples of the technology disclosed in the present application. However, the technology according to the present disclosure is not limited to these embodiments and is applicable to embodiments implemented through modification, substitution, addition, and omission.

The above embodiments describe an example where the subject of the emotion inference performed by emotion inference device 100 is user 20. However, the subject of the emotion inference may be any human being or any non-human creature that has emotions (such as a dog).

The above embodiments describe an example where image sensor 13 and image sensor 150 that obtain the face image of the subject through imaging are used as sensors for sensing the subject. To make an evaluation for each of the emotion attributes of classified emotions on the basis of the result of sensing the image, audio, or biological information of the subject for example (or more specifically, to infer a probability that an emotion attribute is contained in the emotions of the subject), a sensor for sensing the subject is not limited to an image sensor. The sensor may be any sensor used for sensing audio or biological information, for example. Moreover, any algorithm may be used for the aforementioned evaluation made for each of the emotion attributes on the basis of the result of sensing the image, audio, or biological information of the subject for example. Obtainer 110 that obtains the evaluation value group as a result of the evaluation enables emotion inference device 100 or 100a to infer the emotion of the subject more appropriately.

The above embodiments describe examples where the sensor for sensing the subject is provided near emotion inference device 100 and included in emotion inference device 100a. However, as an example, an external computer (such as server device 30) that supplies the evaluation value groups to be obtained by emotion inference device 100 may include a sensor for sensing the subject. As another example, the subject may wear a sensor that transmits a result of the sensing directly or via another device to emotion inference devices 100, 100a, or server device 80 by wired or wireless communications.

The above embodiment describes an example where outputter 140 of emotion inference device 100 outputs the result of the inference process by transmitting this result of the inference process to the external source of emotion inference device 100. However, the output of the result of the inference process is not limited to this. For example, if emotion inference device 100 includes a display or a printer, outputter 140 may output the result of the inference process by displaying or printing this result. As another example, outputter 140 may output the result of the inference process by recording this result onto a recording medium (such as a memory card) that is attachable to and removable from emotion inference device 100.

The functions shared among the components included in each of emotion inference devices 100 and 100a described above can be freely changed. The components may also be combined. For example, obtainer 110 of emotion inference device 100a may include the function of evaluator 160. In this case, obtainer 110 sequentially obtains evaluation value groups by sequentially generating the evaluation value groups by performing, on the basis of the information indicating features for each of the plurality of emotion attributes, the arithmetic processing (such as feature matching of the image) appropriate to the face image obtained as a result of sequentially imaging the face of the subject by image sensor 150, for example.

Processor 130 included in each of emotion inference devices 100 and 100a determines the correction value on the basis of whether the difference between the evaluation values of the same emotion attribute in the first evaluation value group and the second evaluation value group obtained by obtainer 110 exceeds the predetermined criterion, for example. To determine this correction value, a difference between the ranking levels of the evaluation values of the same emotion attribute in the evaluation value groups may be used as the difference between these evaluation values. Alternatively, a difference value or a ratio between the evaluation values may be used as the difference between the evaluation values, for example. If the difference between the evaluation values does not exceed the predetermined criterion (for example, if there is no difference or if the difference is extremely small), the correction value corresponding to this emotion attribute may be reduced. Moreover, a sum of the evaluation values of all the emotion attributes may be normalized to be a constant value, such as zero, by correcting the other correction values after the correction value corresponding to this emotion attribute is reduced. The correction values corresponding the emotion attributes sequentially determined by processor 130 may be used in the correction process achieved by calculation (such as addition) performed on evaluation values of the emotion attributes in an evaluation value group obtained by obtainer 110 afterward (that is, after the first and second evaluation value groups), for example. As a result the evaluation values of the obtained third evaluation value group are changed. The thereby changed third evaluation value group obtained as a result of the correction process is used in the inference process performed by inferer 132 of processor 130.

The result of the emotion inference performed on the subject that is outputted from emotion inference devices 100 and 100a described above is usable for various purposes. Examples of such purposes include: a survey on emotions of viewers toward a television program or a promotional advertisement; a medical diagnosis; and communication with a patient.

The order in which each of the various processes (including the procedures illustrated in FIG. 5 and FIG. 6A to FIG. 6F) is executed by emotion inference devices 100 and 100a described above is not necessarily limited to the order described above. For example, the order of execution may be changed. Alternatively, two or more procedures may be executed in parallel. Or, a part of a procedure may be omitted from execution. All or some of the processes executed by emotion inference devices 100 and 100a described above may be implemented by hardware, such as a dedicated electronic circuit, or by a processor or software. Note that a process achieved using software is implemented by the processor included in emotion inference devices 100 and 100a to execute the program (such as the emotion inference program) stored in the memory. Moreover, this program may be recorded onto a nonvolatile recording medium, such as a computer-readable ROM, an optical disk, or a hard disk, for distribution. For example, the distributed emotion inference program may be installed in emotion inference device 100 or 100a. Then, the processor of the emotion inference device installed with the program may execute this program, enabling the emotion inference device to perform all or some of the processes (including the procedures illustrated in FIG. 5 and FIG. 6A to FIG. 6F). The emotion inference program may be previously recorded on a recording medium (such as storage 120) of emotion inference devices 100 and 100a, or may be supplied to this recording medium via a wide area communication network, such as the Internet. For example, the emotion inference program includes: sequentially obtaining an evaluation value group of the subject of emotion inference, the evaluation value group being a set of evaluation values corresponding to a plurality of emotion attributes of classified emotions (Step S2 in FIG. 5 for example); on the basis of a relationship between a first evaluation value group obtained in the obtaining and a second evaluation value group obtained in the obtaining prior to the first evaluation value group, if a difference under the same emotion attribute between an evaluation value in the first evaluation value group and an evaluation value in the second evaluation value group does not exceed a predetermined criterion (if no difference is present, for example), performing a correction process to correct at least one of evaluation values in the first evaluation value group so that the evaluation value corresponding to the same emotion attribute in the first evaluation value group is reduced (Step S3 in FIG. 5 and Steps in FIG. 6A to FIG. 6F, for example); performing an inference process to infer the emotion of the subject, by inferring an emotion attribute having a relatively higher evaluation value among the plurality of emotion attributes relatively more strongly as the emotion of the subject on the basis of the first evaluation value group obtained as a result of the correction process performed in the performing the correction process (Step S4 in FIG. 5, for example); and outputting a result of the inference process performed in the performing the inference process (Step S5 in FIG. 5, for example).

It should also be noted that a part or all of the functional blocks as the functional elements of above-described emission inference devices 100 and 100a may be integrated separately or integrated into a single chip which is an Integrated Circuit (IC) or a Large Scale Integration (LSI). The LSI integrated as a single chip may function as a computer including a processor, a Random Access Memory (RAM), and the like. Moreover, the method of circuit integration is not limited to LSI. Integration may be realized with a specialized circuit or a general purpose processor. After the LSI circuit is manufactured, a field programmable gate array (FPGA) or a reconfigurable processor capable of reconfiguring the connections and settings of the circuit cells in the LSI circuit may be used. Further, if an integrated circuit technology that replaces LSI emerges from advances in or derivations of semiconductor technology, integration of functional blocks using such technology may also be used. Application of biotechnology is also a possibility.

Furthermore, any combinations of the constituent elements and functions in the above-described embodiments are also embodiments of the present disclosure.

INDUSTRIAL APPLICABILITY

The present disclosure is applicable to an emotion inference device or an emotion inference system that infers emotions of, for example, a human being.

The invention claimed is:

1. An emotion inference device that infers an emotion of a subject, the emotion inference device comprising:
   an obtainer that sequentially obtains an evaluation value group of the subject, the evaluation value group being a set of evaluation values corresponding to a plurality of emotion attributes of classified emotions, the evaluation value group including a first evaluation value group and a second evaluation value group;
   a processor that (i), on the basis of a relationship between the first evaluation value group obtained by the obtainer and the second evaluation value group obtained by the obtainer prior to the first evaluation value group, when a difference under a same emotion attribute between an evaluation value in the first evaluation value group and an evaluation value in the second evaluation value group does not exceed a predetermined criterion, performs a correction process to correct at least one of evaluation values in the first evaluation value group to reduce the evaluation value corresponding to the same emotion attribute in the first evaluation value group, and (ii) performs an inference process to infer the emotion of the subject on the basis of the first evaluation value group obtained as a result of the correction process, the inference process being a process in which an emotion attribute having a higher evaluation value among the plurality of emotion attributes is inferred more strongly as the emotion of the subject; and
   an outputter that outputs a result of the inference process performed by the processor.

2. The emotion inference device according to claim 1, wherein the obtainer sequentially obtains the evaluation value group that is calculated on the basis of a result of sequential sensing performed on the subject by a sensor.

3. The emotion inference device according to claim 2, further comprising an image sensor,
   wherein the obtainer sequentially obtains the evaluation value group by performing, on the basis of information indicating features for each of the plurality of emotion attributes, arithmetic processing appropriate to a face image obtained as a result of sequential imaging performed on a face of the subject by the image sensor.

4. The emotion inference device according to claim 1, wherein a sum of the evaluation values corresponding to the plurality of emotion attributes in the evaluation value group obtained by the obtainer is a constant value, and
   to maintain the sum of the evaluation values in the first evaluation value group obtained as a result of the correction process at the constant value, the processor performs the correction process on the first evaluation value group to increase each of the evaluation values in the first evaluation value group other than the evaluation value reduced.

5. The emotion inference device according to claim 4, wherein when the first evaluation value group includes at least two evaluation values other than the evaluation value reduced, the processor performs the correction process on the first evaluation value group to uniformly increase the at least two evaluation values.

6. The emotion inference device according to claim 1, wherein when a difference under a same emotion attribute between a highest evaluation value in the first evaluation value group obtained by the obtainer and a corresponding evaluation value in the second evaluation value group does not exceed the predetermined criterion, the processor performs the correction process to reduce the highest evaluation value.

7. The emotion inference device according to claim 6, wherein each of the evaluation values in the evaluation value group obtained by the obtainer represents a probability that an emotion attribute having the evaluation value is contained as the emotion of the subject, and
   the difference under the same emotion attribute between the highest evaluation value in the first evaluation value group and the corresponding evaluation value in the second evaluation value group refers to a difference under the same emotion attribute between a highest ranking level of the highest evaluation value in the first evaluation value group and a ranking level of the corresponding evaluation value in the second evaluation value group and, when the difference is not present, the processor performs the correction process on the basis that the difference does not exceed the predetermined criterion.

8. The emotion inference device according to claim 1, wherein after performing the inference process based on the first evaluation value group obtained as a result of the correction process,
   (i) on the basis of a relationship between the first evaluation value group obtained as a result of the correction process and a third evaluation value group obtained by the obtainer subsequently to the first evaluation value group, when a difference under a same emotion attribute between an evaluation value in the first evaluation value group obtained as a result of the correction process and a corresponding evaluation value in the third evaluation value group does not exceed the predetermined criterion, the processor performs a correction process to correct at least one of evaluation values in the third evaluation value group to reduce the corresponding evaluation value in the third evaluation value group, and (ii), on the basis of the third evaluation value group obtained as a result of the correction process, further performs the inference process in which an emotion attribute having a relatively higher evaluation value among the plurality of emotion attributes relatively is inferred more strongly as the emotion of the subject.

9. The emotion inference device according to claim 1, further comprising
   a storage that stores correction values corresponding to the plurality of emotion attributes by a one-to-one correspondence,
   wherein the processor performs an initialization process to initialize the correction values stored in the storage to 0,
   when, after performing the initialization process, there is no difference under a same emotion attribute between a highest ranking level representing a level of a highest evaluation value in the first evaluation value group obtained by the obtainer and a ranking level representing a level of a corresponding evaluation value in the second evaluation value group obtained by the obtainer, the processor performs the correction process to: reduce the correction value corresponding to the emotion attribute having the highest evaluation value; uniformly increase the correction values corresponding to the emotion attributes having the evaluation values other than the highest evaluation value in the first evaluation value group to set a sum of the correction values corresponding to the plurality of emotion attributes to be 0; and add the correction values corresponding to the plurality of emotion attributes to the respective evaluation values in the first evaluation value group, and performs the inference process based on the first evaluation value group obtained as a result of the correction process, and when there is no difference under a same emotion attribute between a highest ranking level representing a level of a highest evaluation value in the first evaluation value group obtained as a result of the correction process and a ranking level representing a level of a corresponding evaluation value in a third evaluation value group obtained by the obtainer subsequently to the first evaluation value group, the processor further performs the correction process to: reduce the correction value corresponding to the same emotion attribute in the third evaluation value group; uniformly increase the correction values other than the correction value reduced to set a sum of the correction values corresponding to the plurality of emotion attributes to be 0; and add the correction values corresponding to the plurality of emotion attributes to the respective evaluation values in the third evaluation value group, and performs the inference process based on the third evaluation value group obtained as a result of the correction process.

10. The emotion inference device according to claim 1, wherein in the inference process performed by the processor on the basis of the evaluation value group obtained as a result of the correction process, the emotion attribute having the highest evaluation value in the evaluation value group is inferred as the emotion of the subject.

11. The emotion inference device according to claim 1, wherein when all the evaluation values in the evaluation value group are to be a same as a result of the correction process performed on the evaluation value group, the processor does not perform the correction process on the evaluation value group.

12. The emotion inference device according to claim 1, wherein when a difference under a same emotion attribute between an evaluation value in the first evaluation value group and an evaluation value in the second evaluation value group is 0, the processor determines that the difference does not exceed a predetermined criterion and performs the correction process to reduce the evaluation value corresponding to the same emotion attribute in the first evaluation value group.

13. An emotion inference device that infers an emotion of a subject, the emotion inference device comprising:
an obtainer that sequentially obtains an evaluation value group of the subject, the evaluation value group being a set of evaluation values corresponding to a plurality of emotion attributes of classified emotions, the evaluation value group including a first evaluation value group and a second evaluation value group;
a processor that, on the basis of a relationship between the first evaluation value group obtained by the obtainer and the second evaluation value group obtained by the obtainer prior to the first evaluation value group, performs a correction process to: determine a correction value on the basis of whether a difference under a same emotion attribute between an evaluation value in the first evaluation value group and an evaluation value in the second evaluation value group exceeds a predetermined criterion; and correct, using the correction value, at least one of evaluation values in a third evaluation value group obtained by the obtainer subsequently to the first evaluation value group to change an evaluation value corresponding to the same emotion attribute in the third evaluation value group, and performs an inference process to infer the emotion of the subject on the basis of the third evaluation value group obtained as a result of the correction process, and
an outputter that outputs a result of the inference process performed by the processor.

14. An emotion inference method of inferring an emotion of a subject, the emotion inference method comprising:
sequentially obtaining an evaluation value group of the subject, the evaluation value group being a set of evaluation values corresponding to a plurality of emotion attributes of classified emotions, the evaluation value group including a first evaluation value group and a second evaluation value group;
on the basis of a relationship between the first evaluation value group obtained in the obtaining and the second evaluation value group obtained in the obtaining prior to the first evaluation value group, when a difference under a same emotion attribute between an evaluation value in the first evaluation value group and an evaluation value in the second evaluation value group does not exceed a predetermined criterion, performing a correction process to correct at least one of evaluation values in the first evaluation value group to reduce the evaluation value corresponding to the same emotion attribute in the first evaluation value group;
performing an inference process to infer the emotion of the subject on the basis of the first evaluation value group obtained as a result of the correction process performed in the performing of the correction process, the inference process being a process in which an emotion attribute having a relatively higher evaluation value among the plurality of emotion attributes relatively is inferred more strongly as the emotion of the subject; and
outputting a result of the inference process performed in the performing of the inference process.

15. A non-transitory computer-readable recording medium embodied with a program for use in an emotion inference device, which includes a microprocessor and infers an emotion of a subject, the program causing the emotion inference device to execute:
sequentially obtaining an evaluation value group of the subject, the evaluation value group being a set of evaluation values corresponding to a plurality of emotion attributes of classified emotions, the evaluation value group including a first evaluation value group and a second evaluation value group;
on the basis of a relationship between the first evaluation value group obtained in the obtaining and the second evaluation value group obtained in the obtaining prior to the first evaluation value group, when a difference under a same emotion attribute between an evaluation value in the first evaluation value group and an evaluation value in the second evaluation value group does not exceed a predetermined criterion, performing a correction process to correct at least one of evaluation values in the first evaluation value group to reduce the evaluation value corresponding to the same emotion attribute in the first evaluation value group;
performing an inference process to infer the emotion of the subject on the basis of the first evaluation value group obtained as a result of the correction process performed in the performing of the correction process, the inference process being a process in which an emotion attribute having a relatively higher evaluation value among the plurality of emotion attributes is inferred relatively more strongly as the emotion of the subject; and outputting a result of the inference process performed in the performing of the inference process.

\* \* \* \* \*